(12) United States Patent
Kuch et al.

(10) Patent No.: US 9,374,324 B2
(45) Date of Patent: Jun. 21, 2016

(54) DETERMINING VIRTUAL ADAPTER ACCESS CONTROLS IN A COMPUTING ENVIRONMENT

(71) Applicant: International Business Machines Corporation, Armonk, NY (US)

(72) Inventors: George P. Kuch, Poughkeepsie, NY (US); Ralph Friedrich, Sindelfingen (DE); Richard M. Sczepczenski, Hyde Park, NY (US); Raymond M. Higgs, Poughkeepsie, NY (US); Elizabeth A. Moore, Sunnyvale, CA (US); Johnathon R. Pandich, Owego, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 180 days.

(21) Appl. No.: 14/212,255

(22) Filed: Mar. 14, 2014

(65) Prior Publication Data

US 2015/0263992 A1    Sep. 17, 2015

(51) Int. Cl.
*H04L 12/931* (2013.01)
*H04L 12/935* (2013.01)
*G06F 9/455* (2006.01)

(52) U.S. Cl.
CPC .......... *H04L 49/354* (2013.01); *G06F 9/45545* (2013.01); *G06F 9/45558* (2013.01); *H04L 49/3054* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,240,098 | B1 | 7/2007 | Mansee |
| 7,516,252 | B2 | 4/2009 | Krithivas |

(Continued)

FOREIGN PATENT DOCUMENTS

| | | |
|---|---|---|
| WO | 2006017584 A2 | 2/2006 |
| WO | 2007141206 A2 | 12/2007 |

OTHER PUBLICATIONS

McAuley, D. et al., IBM Versatile Storage Server, Aug. 1998, http://www.redbooks.ibm.com/redbooks/pdfs/sg242221.pdf.

(Continued)

*Primary Examiner* — Philip Chea
*Assistant Examiner* — Hassan Khan
(74) *Attorney, Agent, or Firm* — Steven Chiu, Esq.; Matthew M. Hulihan, Esq.; Heslin Rothenberg Farley & Mesiti P.C.

(57) ABSTRACT

A control component of a computing environment initiates sending of request(s) over a network of the computing environment by an activated virtual adapter. The activated virtual adapter is hosted on a physical adapter of a host system coupled to the network, and is for use by a guest, hosted by the host system, in performing data input and output. The request(s) retrieve access control information from the network indicative of access control(s) enforced in controlling access by the activated virtual adapter to network component(s). The initiating provides indication(s) to the physical adapter, absent involvement of the guest, that the request(s) be sent by the virtual adapter. Based on the initiating, the control component obtains the access control information from the physical adapter, and determines, based on that information, the access control(s) being enforced by the network in controlling access by the activated virtual adapter to the network component(s).

13 Claims, 19 Drawing Sheets

(56) References Cited

U.S. PATENT DOCUMENTS

| | | | |
|---|---|---|---|
| 8,619,771 B2 | 12/2013 | Lambeth et al. | |
| 8,929,255 B2 | 1/2015 | Hernandez et al. | |
| 2003/0200247 A1* | 10/2003 | Banzhaf | H04L 69/329 718/1 |
| 2004/0230712 A1 | 11/2004 | Belmar et al. | |
| 2005/0080982 A1 | 4/2005 | Vasilevsky et al. | |
| 2005/0114586 A1* | 5/2005 | Brice | G06F 9/45537 711/1 |
| 2005/0120160 A1 | 6/2005 | Plouffe et al. | |
| 2008/0155169 A1 | 6/2008 | Hiltgen et al. | |
| 2008/0215793 A1* | 9/2008 | Hashimoto | G06F 9/5077 711/6 |
| 2009/0319728 A1* | 12/2009 | Bakke | G06F 3/0626 711/153 |
| 2010/0100878 A1* | 4/2010 | Otani | H04L 67/1097 718/1 |
| 2010/0122111 A1* | 5/2010 | Allen | G06F 11/2005 714/3 |
| 2010/0131950 A1* | 5/2010 | Yamada | G06F 3/0605 718/1 |
| 2010/0198972 A1* | 8/2010 | Umbehocker | G06F 3/0604 709/226 |
| 2011/0022812 A1* | 1/2011 | van der Linden | G06F 9/5077 711/163 |
| 2011/0173609 A1 | 7/2011 | Buragohain et al. | |
| 2011/0239213 A1* | 9/2011 | Aswani | G06F 9/45558 718/1 |
| 2012/0084071 A1* | 4/2012 | Cyr | G06F 11/0793 703/25 |
| 2012/0180051 A1* | 7/2012 | Ikegaya | G06F 9/455 718/1 |
| 2012/0218990 A1* | 8/2012 | Subramanyan | H04L 41/12 370/357 |
| 2013/0013569 A1* | 1/2013 | Pafumi | G06F 11/1658 707/679 |
| 2013/0083693 A1 | 4/2013 | Himura et al. | |
| 2013/0097295 A1* | 4/2013 | Garza | G06F 3/0605 709/223 |
| 2014/0064056 A1* | 3/2014 | Sakata | H04L 41/00 370/216 |
| 2015/0036682 A1* | 2/2015 | Atkinson | H04L 29/12367 370/386 |

OTHER PUBLICATIONS

Tate, J. et al, Introducing Hosts to the SAN Fabric, Feb. 2002, http://www.redbooks.ibm.com/redbooks/pdfs/sg246411.pdf.
Office Action in U.S. Appl. No. 14/561,761, dated Nov. 19, 2015, pp. 1-18.
Office Action in U.S. Appl. No. 14/212,241, dated Dec. 15, 2015, pp. 1-29.
Office Action in U.S. Appl. No. 14/561,755, dated Dec. 15, 2015, pp. 1-27.
Notice of Allowance in U.S. Appl. No. 14/212,228, dated Dec. 18, 2015, pp. 1-20.
Notice of Allowance in U.S. Appl. No. 14/561,750, dated Jan. 20, 2016, pp. 1-20.
Notice of Allowance in U.S. Appl. No. 14/561,761, dated Mar. 31, 2016, pp. 1-17.

* cited by examiner

DETERMINING VIRTUAL ADAPTER ACCESS CONTROLS IN A COMPUTING ENVIRONMENT

BACKGROUND

In a computing environment in which multiple guests share a common physical adapter of a host system, each guest may be assigned a respective virtual adapter for use in performing data input and output. Multiple guest operating systems, for instance, may share a physical host bus adapter (HBA), such as a physical fibre channel adapter, to provide connectivity to a network. A physical fibre channel adapter may include multiple virtual host bus adapters (HBAs), each dedicated for use by a respective guest. Typically, a guest will load, i.e. by a boot sequence or initial program load (IPL), into an operating system that will issue commands to bring up, or activate, a virtual adapter assigned to service the guest data input/output (I/O) requests. In channel I/O technologies, these commands are provided as a channel program of specialized instructions known as channel command words, or "CCWs", to activate a virtual HBA on the shared physical channel adapter. The activated virtual HBA will be assigned unique identifiers and other configuration information. For instance, the activated virtual HBA will reach out to the network and request an identifier that uniquely identifies the virtual device within the network.

In large-scale fibre channel networks, endpoints that connect devices to a fabric are known as node ports ("N_ports"). In a storage area network (SAN), as one example, N_ports include ports of the storage devices in addition to the ports of the physical HBAs that access them. These are examples of physical N_ports, though N_ports may also be virtual. Virtual HBAs and other types of virtual adapters that communicate with network devices are termed virtual N_ports.

Both virtual and physical N_ports are assigned a fibre channel identifier ("N_port ID" or "fibre channel id") to uniquely identify the N_port within the local fibre channel network. N_ports—both physical and virtual—login to the network and request the fibre channel id from the fabric. Further, a global unique identifier called a world wide port name (WWPN) is assigned by a system, such as a central electronics complex, of which the N_port is a part. Any host bus adapter, physical or virtual, within a fibre channel environment has an associated WWPN to uniquely identify that component within the environment. Additional configuration information may be assigned to host bus adapters within the environment, which may include hundreds of such host bus adapters and therefore an equally large number of unique HBA configurations.

SUMMARY

Determining and managing a large number of unique configurations for adapters of a computing environment can be challenging, especially given conventional practices in which the configuration for an adapter is determined after the entity which is to use the adapter (for instance a guest system) is loaded and issues requests to obtain such information. Validation of that configuration information and of access controls being enforced by the network to control access by the adapters to those network components is impractical under such circumstances.

Shortcomings of the prior art are overcome and additional advantages are provided through the provision of a computer program product including a computer readable storage medium readable by a processing circuit and storing instructions for execution by the processing circuit for performing a method which includes initiating, by a control component of a computing environment, sending of one or more requests over a network of the computing environment by an activated virtual adapter, the activated virtual adapter being hosted on a physical adapter of a host system coupled to the network, the activated virtual adapter for use by a guest, hosted by the host system, in performing data input and output, wherein the one or more requests retrieve access control information from the network, the access control information indicative of one or more access controls enforced by the network in controlling access by the activated virtual adapter to one or more network components of the network, and wherein the initiating comprises the control component providing one or more indications to the physical adapter, absent involvement of the guest, that the one or more requests be sent by the virtual adapter; based on the initiating, obtaining, by the control component, the access control information from the physical adapter; and determining, by the control component, based on the obtained access control information, the one or more access controls being enforced by the network in controlling access by the activated virtual adapter to the one or more network components Further, a system is provided. The system includes a memory and a processor in communications with the memory, wherein the computer system is configured to perform a method, the method including: initiating, by a control component of a computing environment, sending of one or more requests over a network of the computing environment by an activated virtual adapter, the activated virtual adapter being hosted on a physical adapter of a host system coupled to the network, the activated virtual adapter for use by a guest, hosted by the host system, in performing data input and output, wherein the one or more requests retrieve access control information from the network, the access control information indicative of one or more access controls enforced by the network in controlling access by the activated virtual adapter to one or more network components of the network, and wherein the initiating comprises the control component providing one or more indications to the physical adapter, absent involvement of the guest, that the one or more requests be sent by the virtual adapter; based on the initiating, obtaining, by the control component, the access control information from the physical adapter; and determining, by the control component, based on the obtained access control information, the one or more access controls being enforced by the network in controlling access by the activated virtual adapter to the one or more network components.

Yet further, a method is provided which includes initiating, by a control component of a computing environment, sending of one or more requests over a network of the computing environment by an activated virtual adapter, the activated virtual adapter being hosted on a physical adapter of a host system coupled to the network, the activated virtual adapter for use by a guest, hosted by the host system, in performing data input and output, wherein the one or more requests retrieve access control information from the network, the access control information indicative of one or more access controls enforced by the network in controlling access by the activated virtual adapter to one or more network components of the network, and wherein the initiating comprises the control component providing one or more indications to the physical adapter, absent involvement of the guest, that the one or more requests be sent by the virtual adapter; based on the initiating, obtaining, by the control component, the access control information from the physical adapter; and determining, by the control component, based on the obtained access control information, the one or more access controls being enforced by the network in controlling access by the activated virtual adapter to the one or more network components.

Additional features and advantages are realized through the concepts of aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with aspects described herein, capabilities are provided to activate a virtual adapter, obtain configuration information of the activated virtual adapter, and ascertain based on the configuration information a configuration of the virtual adapter by a control component. This may be performed absent involvement of a guest system or other entity that the virtual adapter services for data I/O processing, and optionally as that entity remains inactive (stopped or even before it is present in host memory). Further capabilities are provided to initiate sending of requests from the activated virtual adapter into the network to determine access controls being enforced to control access by the virtual adapter to network components. Requests may be issued to remote endpoints of the network, such as storage devices, and configuration aspects of the network and the virtual adapter determined based thereon. Based on discovering configuration(s) that are improper, they may adjusted, if desired. This may be performed for many virtual adapters of the computing environment absent involvement of guests that use, or will use, the virtual adapters, and optionally absent the need to activate (load or boot) the guest systems that will use the virtual adapters.

Computing environments of different architectures may incorporate and use one or more aspects provided herein. For instance, environments based on the PowerPC architecture, also referred to as Power ISA, offered by International Business Machines Corporation (IBM®) and described in the Power ISA™ Version 2.06 Revision B specification, Jul. 23, 2010, hereby incorporated by reference herein in its entirety, may include one or more aspects, as well as computing environments of other architectures, such as the z/Architecture, offered by International Business Machines Corporation, and described in z/Architecture—Principles of Operation, Publication No. SA22-7932-09, 10th Edition, September 2012, which is hereby incorporated by reference herein in its entirety.

Z/ARCHITECTURE, IBM, Z/OS and Z/VM (referenced herein) are registered trademarks of International Business Machines Corporation, Armonk, N.Y. Other names used herein may be registered trademarks, trademarks or product names of International Business Machines Corporation or other companies.

Figure 1:
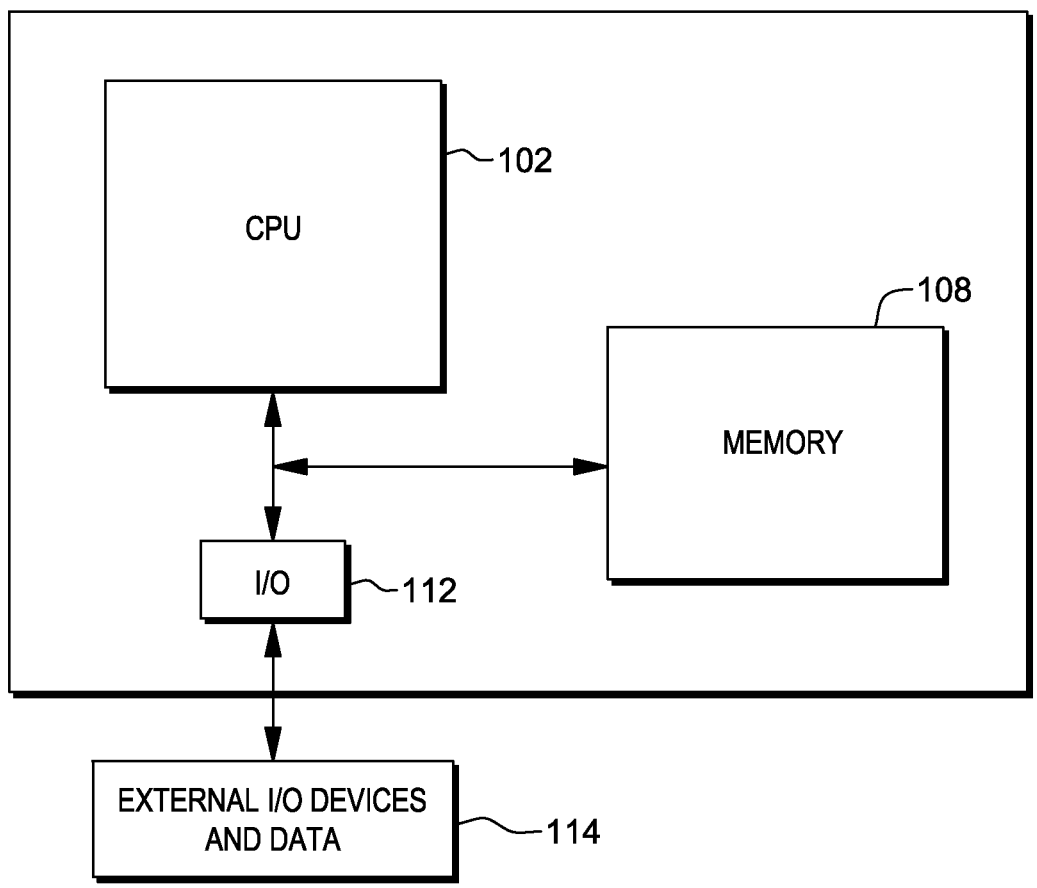
FIG. 1 depicts one example of a computing environment to incorporate and use one or more aspects described herein.

One example of a computing environment to incorporate and use one or more aspects described herein is provided with reference to FIG. 1. In one example, a computing environment 100 includes a processor (central processing unit—CPU) 102. Processor 102 is communicatively coupled to a memory portion 108 having, for instance, a cache (not pictured), and to an input/output (I/O) portion 112. I/O portion 112 is communicatively coupled to external I/O devices 114 that may include, for example, data input devices, sensors and/or output devices, such as displays.

Figure 2:
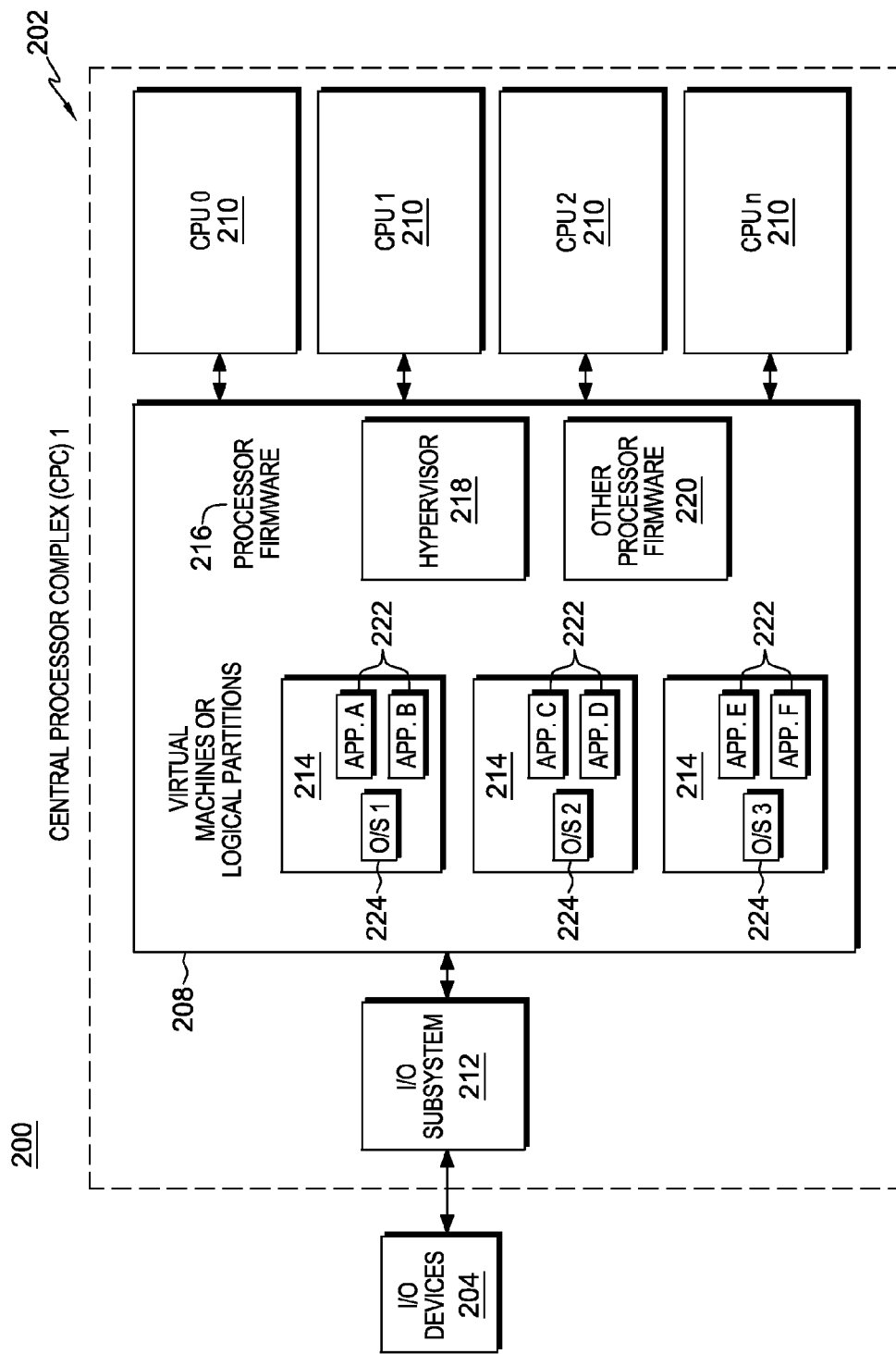
FIG. 2 depicts another example of a computing environment to incorporate and use one or more aspects described herein.

A further embodiment of a computing environment to incorporate and use one or more aspects described herein is depicted in FIG. 2. Referring to FIG. 2, in one example, a computing environment 200 includes a central processor complex (CPC) 202 (also referred to as a Central Electronic Complex—"CEC)" coupled to one or more input/output (I/O) devices 204 through I/O subsystem 212. Central processor complex 202 includes processor memory 208 (a.k.a., main memory, main storage, central storage) coupled to one or more central processors (a.k.a., central processing units (CPUs)) 210 and I/O subsystem 212, each of which is further described below.

Processor memory 208 includes one or more virtual machines 214 (for one example of the PowerPC architecture) or one or more logical partitions 214 (for one example of the z/Architecture), and processor firmware 216, which includes a hypervisor 218 and other processor firmware 220. As used herein, firmware includes, e.g., the microcode and/or milli-code of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each virtual machine or logical partition 214 functions as a separate system and has one or more applications 222, and optionally, a resident operating system 224 therein, which may differ for each virtual machine or logical partition. In one embodiment, the operating system is the z/VM operating system, the z/OS operating system, the z/Linux operating system, or the TPF operating system, offered by International Business Machines Corporation, Armonk, N.Y. The virtual machines are managed by hypervisor 218, such as PowerVM, offered by International Business Machines Corporation, Armonk, N.Y.; and the logical partitions are managed by hypervisor 218, such as the Processor Resource/System Manager (PR/SM), offered by International Business Machines Corporation, Armonk, N.Y.

The virtual machines are hosted on a host system, i.e. CEC 202, and therefore could be considered guests of that host system. As noted above, each virtual machine may load a guest operating system. In some embodiments, a virtual machine may load a hypervisor or guest operating system that itself hosts one or more guests (one or more other guest operating systems, for instance). In this manner, a "guest" may refer generally to a virtual machine or guest operating system that is running on ("hosted by") a host system. Multiple levels of guests may exist, all supported by a lowest level host system (such as CEC 202). Additionally, in some cases, an operating system may itself be, or implement, a virtual machine. Therefore, in some scenarios, a virtual machine may be considered a guest operating system, and vice versa. In any case, the term "guest" as used herein is used broadly to encompass any of the above possibilities.

Central processors 210 are physical processor resources assignable to the virtual machines or allocated to the logical partitions. For instance, each virtual machine or logical partition 214 includes one or more logical processors, each of which represents all or a share of a physical processor 210 that may be dynamically allocated to the virtual machine or partition. A central processor may include various components not depicted herein, such as a memory management unit, translation lookaside buffer, registers, and caches.

Input/output subsystem 212 directs the flow of information between input/output devices 204 and main memory 208 (in some cases via one or more I/O control units, not pictured). I/O subsystem 212 is coupled to the central processing complex in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, host bus adapters, PCI cards, Ethernet cards, Small Computer Storage Interface (SCSI) cards, etc. Further, the I/O subsystem uses one or more input/output paths as communication links in managing the flow of information to or from input/output devices 204.

Figure 3A:
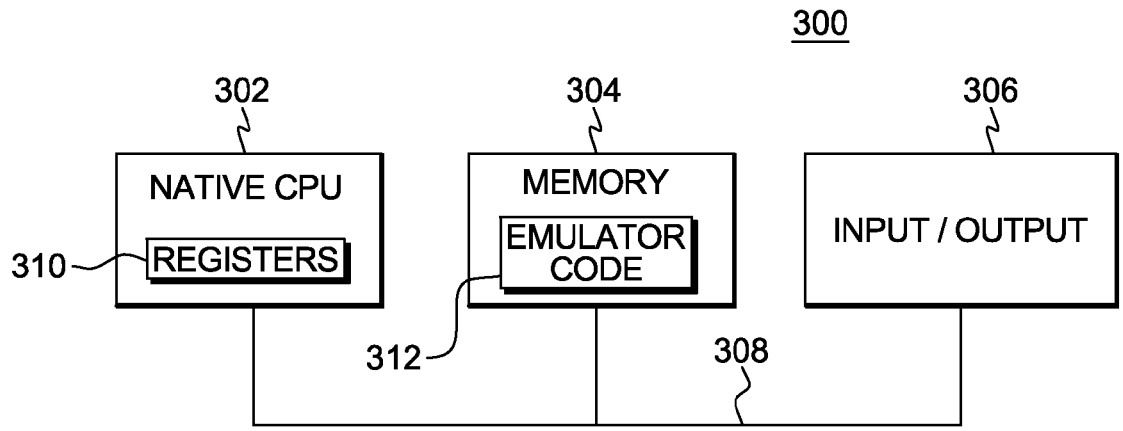
FIG. 3A depicts yet another example of a computing environment to incorporate and use one or more aspects described herein.

Another embodiment of a computing environment to incorporate and use one or more aspects described herein is provided with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment. These registers include information that represents the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate another architecture. For instance, emulator code 312 allows machines based on architectures other than the z/Architecture, such as PowerPC processors, pSeries servers, HP Superdome servers or others, to emulate the z/Architecture and to execute software and instructions developed based on the z/Architecture.

Figure 3B:
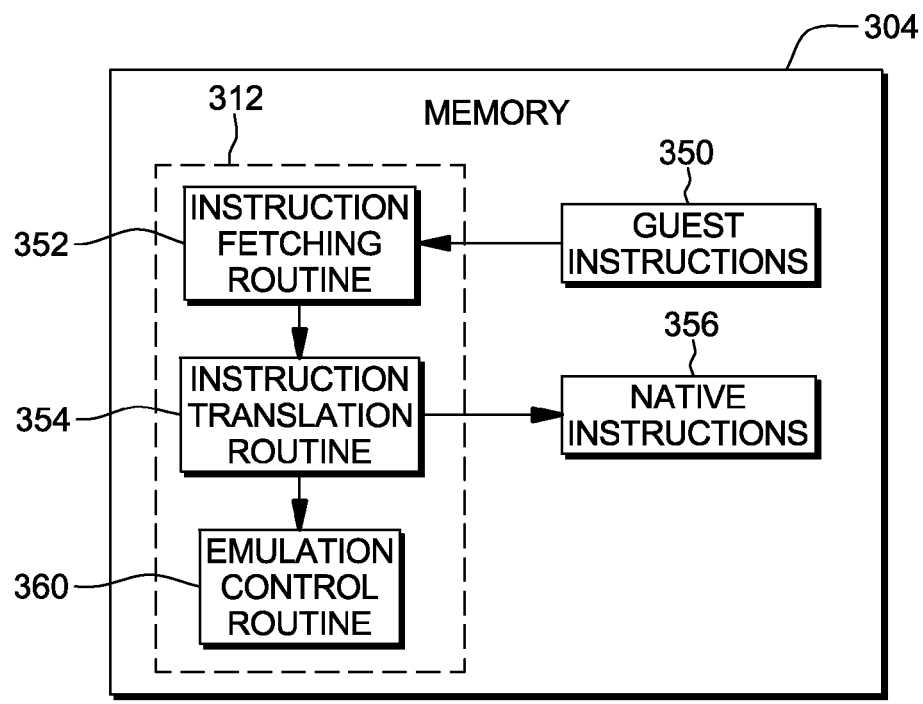
FIG. 3B depicts further details of the memory of FIG. 3A.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a z/Architecture processor 102, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Traditionally, configurations of virtual adapters, such as virtual host bus adapters (HBAs), hosted by physical adapters are validated only after booting the individual guest systems (such as guest operating systems or virtual machines) that are to use those virtual HBAs. Several examples provided herein are described with reference to the Fibre Channel data transport protocol. Adapters within the fibre channel context are called host bus adapters, with a physical HBA being a physical fibre channel adapter, and a virtual HBA being a virtual fibre channel adapter (used interchangeably herein with "virtual HBA"). Channel adapters are used in communicating data in accordance with the fibre channel protocol. Fibre channel adapters are termed "N_ports" in the fibre channel context. Presently, configuration information, such as the world wide port names (WWPNs), of these adapters is not known to a user or administrator until the guests that are to use these adapters are 'brought online', i.e. booted or loaded. For virtual adapters used in a virtual machine environment, for instance, configuration information of a virtual adapter associated with a particular guest (e.g. virtual machine or guest operating system) is not known until the guest undergoes an initial program load (IPL) and subsequently is brought online. This process is usually transparent to users of the guest systems and is not executed until a guest system is booted. After the guest is brought online and the device driver (guest driver for the virtual adapter) is loaded, a request may be made for the virtual HBA to login to the network on behalf of that virtual N_port. A WWPN may be generated within the system of which the adapter is a part (such as a CEC) and used as part of a fabric login process. This is typically the earliest point at which the host (for instance the CEC or a hosting virtual machine thereof) will be able to acquire certain configuration information of the virtual adapter, such as the WWPN or a fibre channel identifier (id) for that virtual adapter.

As noted above, some computing environments may have hundreds of guests using hundreds of corresponding virtual adapters, each assigned its own unique WWPN, fibre channel id, and other configuration information. In light of this, it becomes a tedious, time-consuming, and difficult task for an administrator who desires to obtain this configuration information and determine configurations of the adapters to load each guest and then gather this information by requesting each guest to provide the information to the administrator.

Nonetheless, administrators sometimes desire to obtain configuration information of the virtual adapters of a system. This information may be useful in the configuration of network components, such as in the configuration of zoning in a storage area network (SAN) and logical unit number (LUN) masking in a storage array. Zoning is used to control which devices are accessible to given WWPNs, while LUN masking is used to permit/restrict access (by WWPN) to particular ranges of LUNs within a given accessible device, thereby serving as a protection mechanism to prevent guests from accessing data of other guests. In this manner, configuration information including the WWPNs may be used by SAN and storage array administrators to set storage access controls. While it is desirable to collect this type of configuration information for administrator use, it is inefficient and burdensome to require that each guest be loaded in order to gather this information.

When guests are inactive (stopped and not executing, for instance prior to being IPLd for an execution session, or prior to being loaded into CEC memory, as examples), the virtual adapters (virtual HBAs) exist but are inactive. That is, they are setup insofar as they may be activated for a particular guest, but are not yet configured with, e.g., an assigned fibre channel id or WWPN. The virtual adapter may become activated when, for instance, the guest to which the virtual adapter is dedicated starts up and initiates this activation. The information necessary for the virtual HBA to become a fully configured virtual adapter exists while the guest is inactive, but the configuration is not conventionally constructed until the guest boots and activates the virtual adapter.

According to aspects described herein, a separate control component activates the virtual adapter, thereby invoking construction of the configuration information of the virtual adapter, and does so without guest involvement. The configuration information is obtained by the control component absent a need for the guest to be brought online and the virtual adapter activated by that guest. The configuration information may be obtained by the control component and the configuration of the virtual adapter may be ascertained therefrom. The configuration mirrors what the configuration will be when the guest is brought online to use the virtual adapter to perform data input and output operations. Thus, the ascertained configuration of the virtual adapter may identify the WWPN, which is the WWPN that will be assigned to the virtual adapter when the guest associated with that adapter is eventually loaded and activates the virtual adapter for use in performing data input and output.

The configuration information and configuration(s) ascertained therefrom may be used for administrative purposes, for instance in determining whether the virtual adapter and/or components to be accessed by that virtual adapter are appropriately configured. Additionally, this activating, obtaining of configuration information, and ascertaining of configuration may be repeated for many virtual adapters, such as each available virtual HBA on a particular physical channel.

Aspects described herein enable obtaining of configuration information for a virtual adapter and ascertaining of the configuration of that virtual adapter which may be performed absent any involvement of the guest to which the virtual adapter is, or will become, dedicated. This may also be performed absent any communication between the control component and that guest, and absent any need to load that guest. The configuration or ascertained configurations can be exported, analyzed, tested, debugged, or used in any other manner desired.

Thus, a control component can activate the virtual adapters, obtain the configuration information thereof, and ascertains configurations of the virtual adapters. Cooperating program code (such as firmware) may be provided within the CEC and/or components thereof, such as the physical channel adapter. The provided code may be an extension to existing firmware of the physical adapter. In some embodiments, the provided code supports receipt of service requests from the control component. Service requests could be commands, for instance control words. The provided code and control component may communicate directly through the host system absent any interaction with the guest, in order to exchange data, receive the service requests, drive the appropriate functions of the physical adapter or virtual adapter being activated, obtain configuration information, and provide the information to the control component.

Figure 4:
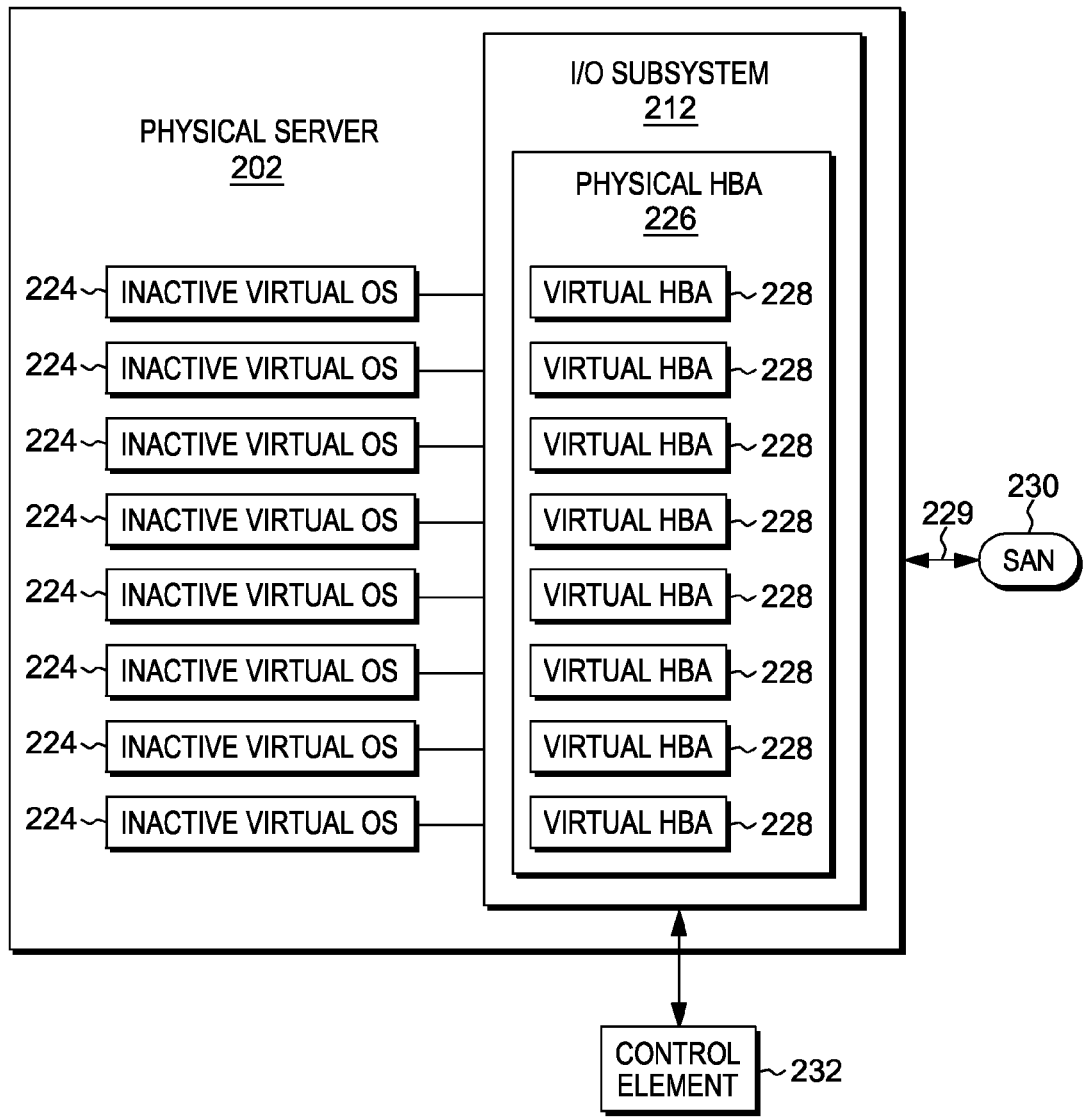
FIG. 4 depicts further details of a computing environment in which virtual adapters are activated by a control element, in accordance with one or more aspects described herein.

Referring now to FIG. 4, further details are provided of a computing environment in which virtual adapters are activated by a control element in accordance with one or more aspects described herein. System 202 is, for instance, a CEC (FIG. 2) or other physical server, and includes components depicted and described with reference to FIGS. 1-3B, some of which have been omitted from depiction in FIG. 4 for convenience.

System 202 of FIG. 4 is a host system hosting a plurality of virtual operating systems (OSs) 224. In FIG. 4, the virtual OSs 224 are shown as being inactive—that is, not running or executing. In this inactive state, they may reside in memory (storage) but be in stopped or unloaded state. In one example, they are inactive until they are IPLd and brought online. After a session of execution, they may be rendered inactive by pausing or by shutting them down, for instance.

System 202 includes a plurality of guests 224. In the example of FIG. 4, guests 224 are guest virtual OSs. System 202 may include one or more virtual machines (not pictured) with each different virtual machine hosting one or more virtual OSs 224. As described above, there may be multiple levels of guests executing within system 202. For example, system 202 may execute one or more guest virtual machines or operating systems, with each guest virtual machine or operating system itself executing several guest virtual machines or guest operating systems.

System 202 includes an I/O subsystem 212 having a physical HBA 226. The physical HBA hosts multiple virtual HBAs 228 for use by virtual OSs 224. System 202 is in communication with storage area network components 230 across one or more communication links 229. Storage area network components 230 can include storage device(s) to which system 202 is attached and to which virtual HBAs 228 are given access. The communication link(s) may include an intervening network fabric having one or more network switches, as examples. Many other topologies are possible, including a point-to-point topology in which system 202 is directly connected to a storage device absent any intervening network fabric or switches.

Conventionally, a virtual OS or other guest would start (load, boot, activate, etc.) and, as part of its execution, activate a virtual HBA assigned to the guest, the virtual HBA for use in performing data input and output for the guest. Activation by the guest includes causing functions of the physical adapter and/or network components to be invoked to assign the virtual HBA a fibre channel id and WWPN, which may then be returned to the guest activating the adapter. For instance, the WWPN for the virtual HBA may be obtained by the physical HBA from facilities inside the CEC. The fibre channel id (as well as other information) may be obtained from the network. An administrator may then query the guest (or an entity that has access to guest state) to obtain that configuration information and determine therefrom a configuration of the virtual HBA, such as a WWPN assigned thereto.

In accordance with aspects described herein, and as depicted in FIG. 4, a control component (control element 232) is provided. Control element 232 is, in this example, a physical component separate from the physical server, though in other examples the control component may be part of physical server 202. The control element may be incorporated into an existing separate component for managing a CEC. These are commonly referred to as management control elements, service elements, or system control elements, as examples. In some embodiments, the control element is provided as part of a Hardware Management Console. The control element may be a separate physical system having its own set of processor(s), memory, and the like from that of the CEC that it manages.

Control element 232 is in communication with system 202, for instance the I/O subsystem or other components thereof, across one or more communication paths. The control element can make use of support facilities provided within the I/O subsystem, as an example. The support facilities may be existing support facilities that facilitate management of the CEC by a control component. Example support facilities may include flexible service processors (FSPs). FSPs may be, in some examples, auxiliary processors implemented as firmware and scattered throughout a host system (CEC 202, as an example). The control element 232 may communicate with a support facility, and vice versa. In some examples, control element 232 communicates directly with one or more FSPs (not pictured) of I/O subsystem 212 or other components of system 202.

I/O subsystem 212 and/or physical HBA 226 thereof is configured to receive requests to perform functions including activation and configuration of virtual adapters 228. Example requests that may be handled by a physical HBA 226 are commands that are issued by a guest. In accordance with aspects described herein, control element 232 issues requests to I/O subsystem 212, or more specifically to physical HBA 226 thereof. These requests from the control element may also be command words (or control words) but have a different structure and/or protocol than those issued by the guest. The different structure/protocol may be a new structure/protocol or may be an existing structure/protocol used for invoking maintenance or other service functions of the physical channel, for instance functions to alter and/or display values in memory of the physical adapter. Existing unique command sets and buffer management protocols may exist to enable movement of data back and forth between the control element and a physical channel (physical HBA 226). These system control facilities may be different control facilities from those invoked by commands from a guest. In accordance with aspects described herein, requests from a control element may be used to invoke system control facilities, of a physical channel, that perform the same or similar functions as control facilities that a guest would invoke to activate and initiate configuration of a virtual adapter.

Control element 232 can request the physical adapter to construct configuration information for a virtual HBA 228 that is not currently activated (by a guest to which the virtual HBA is assigned). The configuration information it represents is the configuration that would be created for a virtual adapter after a guest boots and activates the adapter. The control element can invoke a procedure of the physical adapter that causes the physical adapter to obtain, for a given virtual adapter, a WWPN that will become associated with that particular virtual adapter when a guest causes its activation.

The control element can also invoke functions to provide additional configuration information after a guest has been brought online, activated the virtual adapter, and logged into to a fibre channel network/device via that virtual adapter. Validation can be performed using the control element after a guest is brought online. The control element may operate non-disruptive to the guest using the virtual adapter, requesting additional configuration information directly from the physical adapter after the guest is running and actively using the virtual adapter. One benefit to the control component issuing requests after the guest is active is that it can provide additional configuration information that is only available based on the guest being loaded. When a fibre channel ID is presented, it is implied that the guest is actively using the virtual HBA. In addition, other dynamic data could be retrieved from the virtual HBA once it is in use by the guest.

The control element may activate and gather configuration information for any number of virtual HBAs that are hosted on a particular physical HBA. The gathered information may be provided or exported for use by other processes and applications, administrators, or any other entity. In some examples, the information is used in establishing, verifying, validating, or debugging network component zoning, for instance SAN zoning. In this regard, it can be determined whether the ascertained configuration of a virtual adapter (for instance the assigned WWPN) is an appropriate virtual adapter configuration for the respective guest and, if not, the virtual adapter and/or network components may be reconfigured, all prior to activating the guest. This may prospectively fix problematic configurations before bringing any of the guests online and thereby more efficiently identify and address adapter misconfigurations.

The configuration information obtained by the control element includes, in the examples above, a WWPN and a virtual fibre channel id. Other configuration information may be obtained in order to ascertain other configurations for the virtual adapters. For instance, the configuration information may include virtual adapter device numbers. When a virtual HBA, for instance, is allocated to a guest, a device number is allocated to that the virtual adapter. The device number is an I/O subsystem concept of numbering, analogous to virtual HBA numbering. The device number uniquely identifies a virtual HBA number. A device number for a virtual adapter is available to an activated virtual adapter regardless of whether the guest that is to use that virtual adapter is active. Validation can therefore be performed on all the device numbers that are available on a physical channel before these device numbers are assigned to the individual guests. Other fabric and remote N_Port data that can help in the diagnosis of various classes of issues may also be obtained. These might include performance information, event counters, and optical power information, among other information. Further example configuration information includes that which may be maintained in control blocks and obtained from a virtual HBA after issuing a request to the virtual HBA, such as information indicating firmware version, protocol versions supported, data structure size limits, maximum data transfer size, features supported by the virtual HBA, features supported by host connection, fibre channel network topology, link speed, adapter type, peer D_ID, number of status read buffers, local fibre channel port ID, local and remote N_Port service parameters, number of ports, hardware version, hardware serial number, LOGI Accept Payload, and performance data such as input requests, output requests, control requests, input megabytes, output megabytes, seconds since subchannel activation, output megabytes, channel processor utilization, channel bus utilization, and adapter utilization, as examples.

Aspects described above can be leveraged to facilitate determination and validation of access controls being enforced in controlling access by the virtual HBAs to component(s) of a network to which the adapters are attached. Access controls may be those applied by the network (i.e. applied by components thereof, such as switches, firewalls, storage arrays, etc.). In the case of a storage area network, a network switch is typically configured for multiple zones. The adapters to use the SAN devices are assigned to these zones. If a virtual adapter is assigned to a particular zone, the virtual adapter will be able to access remote N_ports in that zone. Conversely, a virtual adapter that is not part of a given zone will not have access to N_ports of that zone. An N_port may be a port of a storage device having a storage array. Fabric zoning therefore may isolate adapters based on each of their assigned WWPNs, or on an N_Port basis, as examples, according to which storage arrays in the SAN the adapters are to be able to access.

Within a storage array, logical units of storage are assigned logical unit numbers (LUNs). LUN masking may be used to control which LUNs of a storage array are made available to each of the WWPNs. Validation of access controls is the process of determining what access controls apply to control (i.e. allow or deny) adapter access to network component(s) and/or resources thereof. In the SAN content, validation might be used to determine the LUNs to which a given guest has access and/or the zone(s) of which the guest is a member, and to validate that a given guest has access (or is denied access) to the appropriate network resources.

In some situations, determination of access controls being applied for controlling physical and virtual adapter access may be performed out-of-band, in which a separate link to a switch, storage array, or other network component is established and used to communicate with a target component to obtain access control information, for instance zoning information in the case of a SAN. Example separate links include a separate Ethernet connection to a network fabric switch or a tunnel to the command line interface or web interface of a storage device. These types of out-of-band determination of access control are not as robust and reliable as performing in-band queries.

An example of in-band querying relies on a loaded guest of the host system. One option is to have the guest using a virtual adapter issue queries or other requests, obtain the responses, and then provide information back to an administrator. Access control validation in these situations is not being performed until the guest is booted and can issue requests to the physical adapter for sending into the network by the virtual adapter. As described previously, a requirement that the guest be running to issue requests to obtain configuration information may be tedious and time-consuming, especially in the administration of a network in which there are tens or hundreds of devices accessing many network components, with multiple administrators performing zoning and other access control setup and validation.

Consequently, and in accordance with further aspects described herein, the control element can, after activating a virtual adapter, use support facilities of the physical adapter to cause the activated virtual adapter to issue requests to network devices. The information obtained based on these requests can be used to determine access controls being enforced for controlling access by the virtual adapter to network components.

The control element can use a request structure and protocol to initiate sending of requests by the activated virtual adapter. The request structure and protocol may be the same or different from the one used above to activate the virtual adapter and initiate construction of, e.g. the WWPN. The requests being sent by the virtual adapter may be the same as, or similar to, those that a guest might cause the virtual adapter to issue after the guest is brought online.

In the SAN context, the control element can initiate sending of SAN and device I/O requests from the virtual adapter in order to probe and debug access control configurations of the SAN. This may be performed with or without the guest (to use that virtual adapter) currently executing. In some embodiments, therefore, the control element can initially activate a virtual adapter absent any involvement of the guest, as above, and then issue request(s) to the physical adapter to cause the activated virtual adapter to issue request(s) into the network.

Such requests issued into the network might include requests to log into the SAN and requests to execute commands that probe for network access control information, for instance indications as to what components the guest has access to in the SAN. Zoning and LUN masking access controls, in addition to other types of access controls, can be determined based on the results of those requests. By way of further example, a control element could activate a virtual adapter and invoke a query through that virtual adapter to query the SAN to indicate what resources (for instance N_ports) in the zone (to which the WWPN for the virtual adapter is assigned) are available to that virtual adapter. Once it is known what N_ports are accessible to the virtual adapter, a particular N_port that is accessible in the zone can be selected, and request(s) can be sent to that N_port to probe for additional information, such as the type of device to which the N_port belongs. The device could be a storage array of varying types offered by varying entities. An example type of storage array is the Enterprise Storage Server® ("DS8000") storage array offered by International Business Machines Corporation (Enterprise Storage Server® is a registered trademark of International Business Machines Corporation, Armonk, N.Y.), thought other types of storage arrays are possible.

Once a type of device is determined, follow-up requests tailored to that particular type of device may be issued. For instance, requests can be issued to obtain link error statistics and node identifiers. In cases of the device having a storage array with one or more LUNs, a request to the storage device can include a LUN interrogation request, such as a REPORT LUNS SCSI command in the case of a SCSI storage array. The storage device would respond to the LUN interrogation request by providing back to the virtual adapter information that may then be provided to the control element by the physical adapter and/or other component of the I/O subsystem.

Processes are provided to enable a control element, such as one under direction of an administrator or other user, to activate a virtual HBA and initiate the sending of requests by the virtual HBA to obtain access control information. These requests sent to components of the network by the virtual HBA may be the same as or similar to commands that could be issued by the virtual HBA after a guest is booted. In some embodiments, these requests include, as discussed above, requests to a name server to discover which remote N_ports are available to the guest in the zone to which the guest belongs. The information returned from a network component to the virtual adapter (and therefore the physical adapter that hosts the virtual adapter) in response can be provided to the control element. The control element can also request that the virtual adapter perform activities to facilitate communication with the remote N_ports, for instance setup structures to permit the virtual adapter to subsequently talk to particular control units (e.g. storage arrays) to which those remote N_ports correspond. Additionally, the control element can direct the virtual adapter to issue additional commands to further probe network devices. Some or all of the information acquired by the virtual adapter as a result of, and in response to, the issued requests can be provided to the control element as access control information. The access control information may then be used to determine, by the control element or a user, access controls being enforced by the network (e.g. components thereof) in controlling access by the virtual adapter to network components. The determined access controls, such as fabric zoning and LUN masking details, may be validated by the control element or administrators, as examples.

As above, this validation can serve to trigger a reconfiguration of the virtual adapter and/or network components, if appropriate. For instance, the control element or an administrator may determine, based on the obtained access control information access controls determined therefrom, whether the access controls are appropriate access controls for controlling access by the activated virtual adapter (and by proxy, the guest) to the network components. If not, the activated virtual adapter or a network component of the network may be reconfigured to fix the erroneous access control being enforced. All of this may be performed regardless of the state of the guest, for instance as the guest remains stopped or perhaps not even loaded into CEC memory. In some instances, when the control element has gathered the desired information after activating the adapter and invoking sending of requests therefrom, the control element may cause the physical adapter to return the virtual adapter to its state prior to the control element's activation thereof, for instance a deactivated or non-configured state.

In some examples, the requests issued by the virtual adapter may be the same as those that would be issued if triggered by a guest IPL, although the manner used by the control element to initiate the sending of those requests may be different from the manner used by the guests to trigger sending of those requests. Commands provided from the control element to the physical channel may arrive through a different structure/protocol than the commands issued by a guest to the physical channel, for instance. Process thread(s) may execute on the physical channel and receive service control word(s) from the control element. The thread(s) may then identify what the control element is attempting to invoke by its issuance of these service control words, translate that to requests (e.g. functions, operations, etc.) invocable by the virtual adapter, and then cause the virtual adapter to issue those as requests to the network. All of this may coexist with the physical and virtual adapters' abilities to service requests from the guest that is servicing the virtual adapter. In other words, the initiating of the requests to be sent, the sending of the requests, the receiving of responses, and the providing of configuration information and access control information back to the control element may all be performed non-disruptive to the guest's use of the virtual adapter to perform data input and output. Similarly, the guest's uses of the virtual adapter for data input and output may be non-disruptive to the management activities being performed by the control element.

Figure 5:
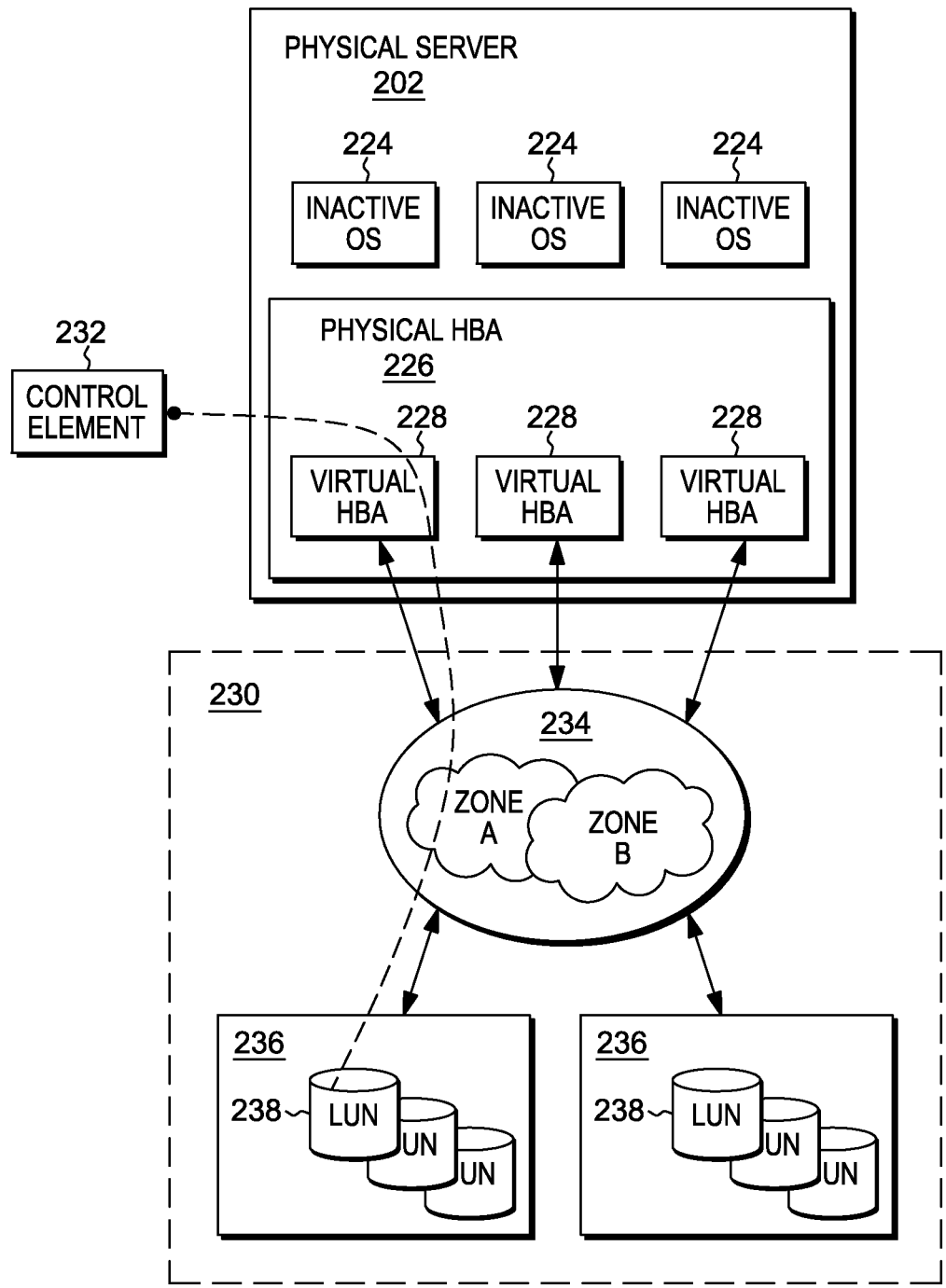
FIG. 5 depicts an example in which a control element initiates sending of requests by a virtual adapter into a storage area network, in accordance with aspects described herein.

FIG. 5 depicts an example in which a control element initiates sending of requests by a virtual adapter into a storage area network, in accordance with aspects described herein. As above with FIG. 4, a control element 232 is in communication with system 202 (physical server in FIG. 5) that includes three inactive operating systems 224 and a physical HBA 226 hosting three virtual HBAs 228 in this example. The three inactive OSs 224 may each be assigned a respective virtual HBA 228 of the three virtual HBAs for use in performing data input and output, i.e. receiving data from, and sending data to, the network or other components of the physical server. Each of the virtual HBAs 228 has a respective communication path to SAN components 230, which include a fabric 234 that may include one or more fabric switches. Fabric 234 is logically and/or physically partitioned into multiple zones. In the example of FIG. 5, fabric 234 is partitioned into zone A and zone B. Each zone is given access to a respective storage device 236, each of which includes a storage array. Typically, a zone is given access to a single (logical or physical) storage device and denied access to other storage devices, for instance those available to other zones.

Each storage device 236, corresponding to a respective zone in this example, is logically partitioned into logical units identified by logical unit numbers (LUNs). This partitioning provides a way of controlling which virtual adapters that are part of the same zone have access to which logical storage units. LUN masking, in which a virtual adapter is given access to one or more LUNs of the array but denied access to other LUNs of the array, provides a finer granularity of control than zoning typically provides.

The dashed path in FIG. 5 conceptually represents a path for issuing requests to obtain access control information of SAN components 230. Initially, control element 232, running on a management control element for instance, can request physical HBA 226 to activate a virtual HBA 228 as described above. The control element can also initiate sending of requests into the SAN. The control element may, as above, communicate with the physical HBA via support facilities of physical server 202, such as one or more FSPs included therein. A request may be made from the control element 232 to physical HBA 226. The request may cause physical HBA 226 to construct appropriate requests (e.g. commands) to be sent into the SAN via the activated virtual HBA. The requests are sent to/through fabric 234 in this example. Validation of access controls may proceed incrementally by incrementally issuing requests that may or may not be based on responses to previously issued requests. At each increment, information retrieved by, returned to, or determined by the virtual adapter (or physical adapter) may be reported to the control element 232 and optionally used by the control element to determine further requests that the virtual adapter it to issue to the network.

By way of specific example, an initial request may be sent from the control element to the physical adapter requesting that the virtual adapter be activated. The control element may then send one or more requests to the physical adapter requesting that requests be sent from the virtual HBA into the network. An initial such request sent by the virtual HBA can be to log the virtual HBA into the network fabric. The request may be sent to a fabric controller and request an indication of which remote N_ports are accessible to the virtual adapter. A follow-up request may be made through the fabric to one of the remote N_ports, for instance a remote N_port of a storage device 236, to determine whether a login session on behalf of that virtual adapter can be completed. One or more subsequent requests may be to query the storage device through that remote N_port. An example such query may be a LUN interrogation request, such as a REPORT LUNS SCSI command, to request that the storage device's logical unit inventory accessible to the virtual adapter be returned. The logical unit inventory may include a list including the LUNS of all logical units accessible to the virtual adapter (and by proxy accessible to the guest that is to use the virtual adapter when the guest is brought online). Based on results of the LUN interrogation request, additional requests may be sent through fabric 234 and the N_port of storage device 236 to a particular LUN.

The above facilities enable in-band validation of access controls being enforced from the point of the virtual HBA to the individual remote end points, including any intervening components. Since the requests being issued are indistinguishable from those that would be issued after a guest is brought online, the same information obtainable by a guest may be obtained by the control element without involvement of the guest and absent any need for the guest to be brought online.

Data obtained from remote endpoints may be returned to the control element. This information can be used by administrators or other users to establish and verify access controls being enforced to control access by the virtual adapter (and by proxy the guest which is to use that virtual adapter, when it is brought online). In some embodiments, the control element presents a graphical user interface that provides indications of some or all of the configuration information for a virtual adapter and the access controls being enforced. The presented graphical user interface may be presented as part of a web front-end within a browser running on the control element of a remote device accessible to data provided by the control element.

The presented information may be organized in varying level of detail. The user interface may initially present a first level of information, such as the WWPNs and/or the device numbers assigned to each of the virtual adapters within one or more CECs. This may be presented based on the control element activating these virtual adapters and that information being provided by the host system to the control element in response. Within this initial interface, a link may be provided to select a WWPN of the presented WWPNs. At some time prior to, or based on, selection of the WWPN, the control element may initiate the sending of requests by the virtual adapter to network component(s). For instance, a request may be sent from the virtual adapter to a name server in a SAN. Based on receiving that request, the name server may provide access control information back to the virtual adapter, which may then be provided by the physical adapter or another component of the host system to control element for presentation in the user interface. The returned access control information may include a listing of all remote N_ports (corresponding to different storage arrays, for instance) available in the zone to which the WWPN is given access. The interface may present this information and enable a user to select a remote N_port. At some time prior to, or based on, selection of the remote N_port, the control element may initiate the sending of request(s) by the virtual adapter to the N_port to obtain access control information indicating LUNs to which the selected WWPN has access. Going further, requests may be issued by the virtual HBA, based on invocation by the control element, to query for information including node identifiers and link error status blocks, as examples.

The structure, format, arrangement, and other properties of the requests being sent by a virtual adapter may be dictated by the particularities of the network to which the virtual adapter is attached. Such particularities include the type of network (such as switched fabric, point-to-point, Arbitrated loop, etc) and the protocol used to talk to the network devices. In a fibre channel network, for instance, the fibre channel protocol would dictate the specifics of the requests being issued.

Described above are facilities that enable, for instance, mapping configuration information and resource availability for virtual adapters that are to be used by virtual guests of a host system. These facilitates are enabled absent any need for the guests to be running and absent any need for guest or hypervisor intervention.

Accordingly, aspects described herein provide processes for ascertaining configuration of a virtual adapter. An example such process is described and depicted with reference to FIG. 6. The process of FIG. 6 may be performed at least partially by a control component of a computing environment as described herein.

The process begins by activating a virtual adapter (602) of a computing environment. The virtual adapter may be hosted on a physical adapter of a host system of the computing environment and may be for use by a guest of that host system in performing data input and output. In particular embodiments, the physical adapter may include a physical fibre channel adapter and the activated virtual adapter may be a virtual fibre channel adapter hosted on the physical fibre channel adapter.

The activating may be by a control component, such as a control element, of the computing environment. The activating may be performed by way of the control component providing a request to the physical adapter that the virtual adapter be activated and configured. The request that the virtual adapter be activated can be provided to the physical adapter via a system control facility of the physical adapter. The system control facility may be a management control facility that is different from a control facility that the guest may use to activate the virtual adapter.

Further, the activating can activate the virtual adapter absent involvement of the guest. Yet further, the guest may remain inactive during the activating of the virtual adapter. For instance, the activating of the virtual adapter may occur while the guest is stopped, prior to an initial program load of the guest.

The control component may be a separate system from the host system. In some embodiments, the host system executes on a first set of processor(s) and the control component executes on a second set of processor(s) that are different from the first set of processor(s).

Figure 6:
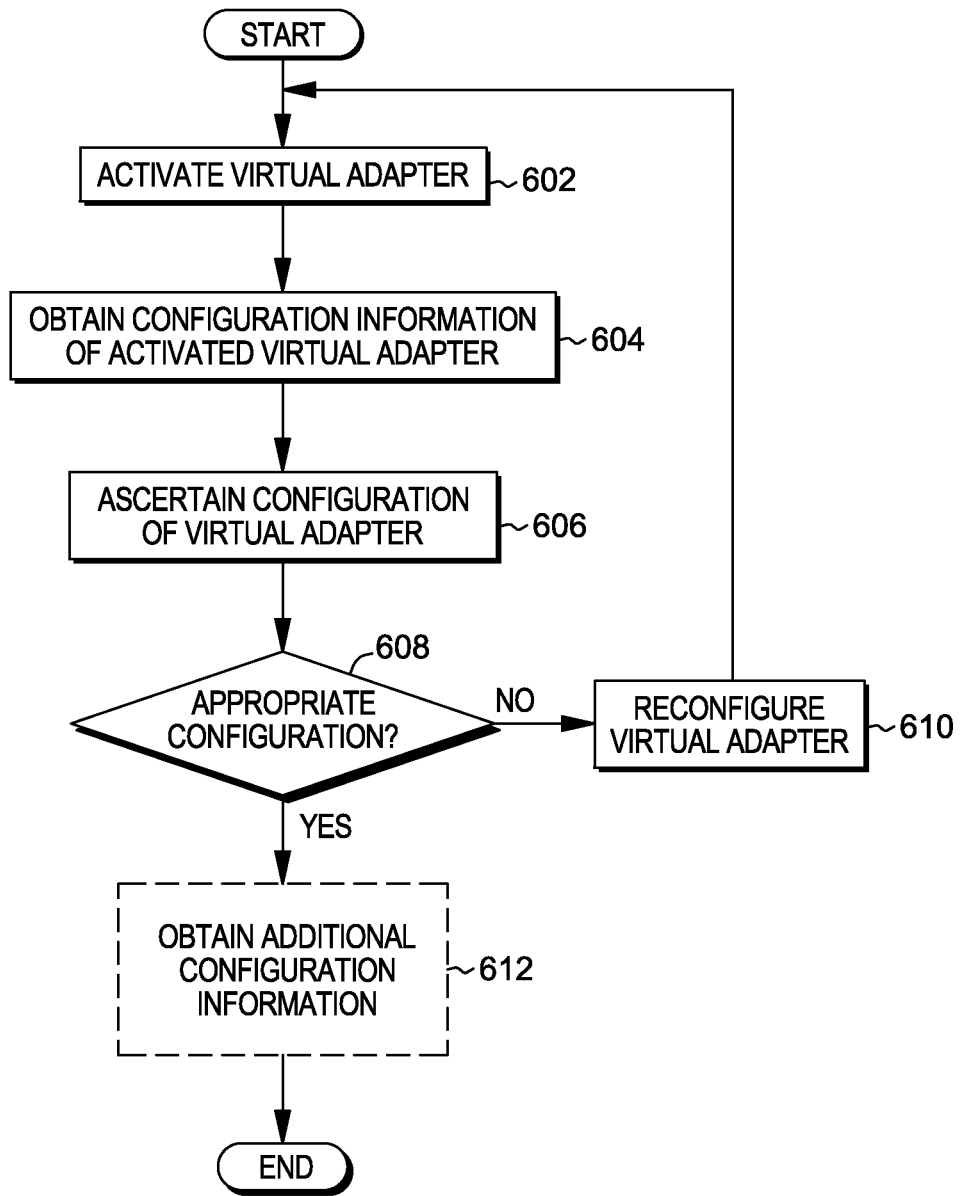
FIG. 6 depicts an example process for ascertaining configuration of a virtual adapter, in accordance with aspects described herein.

Continuing with the process of FIG. 6, based on activating the virtual adapter, the control component may obtain configuration information of the activated virtual adapter (604). The configuration information may be obtained from the physical adapter and be generated based on the activating by the control component. The activating may invoke configuration of the virtual adapter to be performed by the physical adapter. As part of this configuration, a world wide port name may be assigned for the activated virtual adapter. The configuration information obtained by the control component can include this world wide port name for the activated virtual adapter.

The process continues by ascertaining, by the control component, a configuration of the activated virtual adapter (606) based on the obtained configuration information. For instance, when the configuration information indicates a world wide port name for the virtual adapter, the ascertaining may include the control component determining what the world wide port name is for that adapter.

Continuing with FIG. 6, is then determined whether the configuration of the activated virtual adapter is an appropriate virtual adapter configuration for the guest (608). This may be based on, for instance, user policies or desires regarding how the virtual adapter is to be configured. This determining may be performed while the guest remains inactive. If it is determined that the configuration is not an appropriate virtual adapter configuration for the guest, the process proceeds by reconfiguring the activated virtual adapter (610). In some examples, this is performed automatically by a component, such as the control component, having the ability to reconfigure the physical adapter or other aspects of the host system prior to activating the guest. In other examples, the reconfiguration may be effected by an administrator or other user.

The reconfiguration may require that the virtual adapter be deactivated. In any case, the above process may be repeated to again ascertain a configuration of the virtual adapter, i.e. to verify that the reconfiguration has resulted in an appropriate configuration for the virtual adapter. If the virtual adapter is to be reactivated, then, as depicted in FIG. 6, the process returns to perform activation of the virtual adapter (602), otherwise the process may return directly to (604) in cases where the reconfiguring was performed as the adapter remained activated.

Returning to (608), if the configuration is appropriate, and optionally in some embodiments, subsequent to the activation of the guest, the control component requests from the physical adapter additional configuration information of the activated virtual adapter, and obtains the additional configuration information based on that requesting (612). Additional configuration of the activated virtual adapter may be ascertained based on the obtained additional configuration information. In some examples, this additional configuration information is requested after the guest has been activated (i.e. when it is running, after an initial program load). The guest may also be actively using the virtual adapter. The requesting of the additional configuration information and the receiving of the additional configuration information by the control component from the physical adapter may be non-disruptive of use of the activated virtual adapter by the guest in performing data input and output. Furthermore, the guest may use the activated virtual adapter in performing data input and output non-disruptive of the requesting and the receiving of this additional configuration information by the control component.

Some or all aspects of FIG. 6 may be performed by the control component absent any communication between the control component and the guest. In some cases, the process of FIG. 6 is performed for multiple virtual adapters hosted on one or more physical adapters, with each virtual adapter of the plurality of virtual adapters being provided for a respective guest of a plurality of guests of the host system. All or some of the guests may remain inactive during this process.

Figure 7:
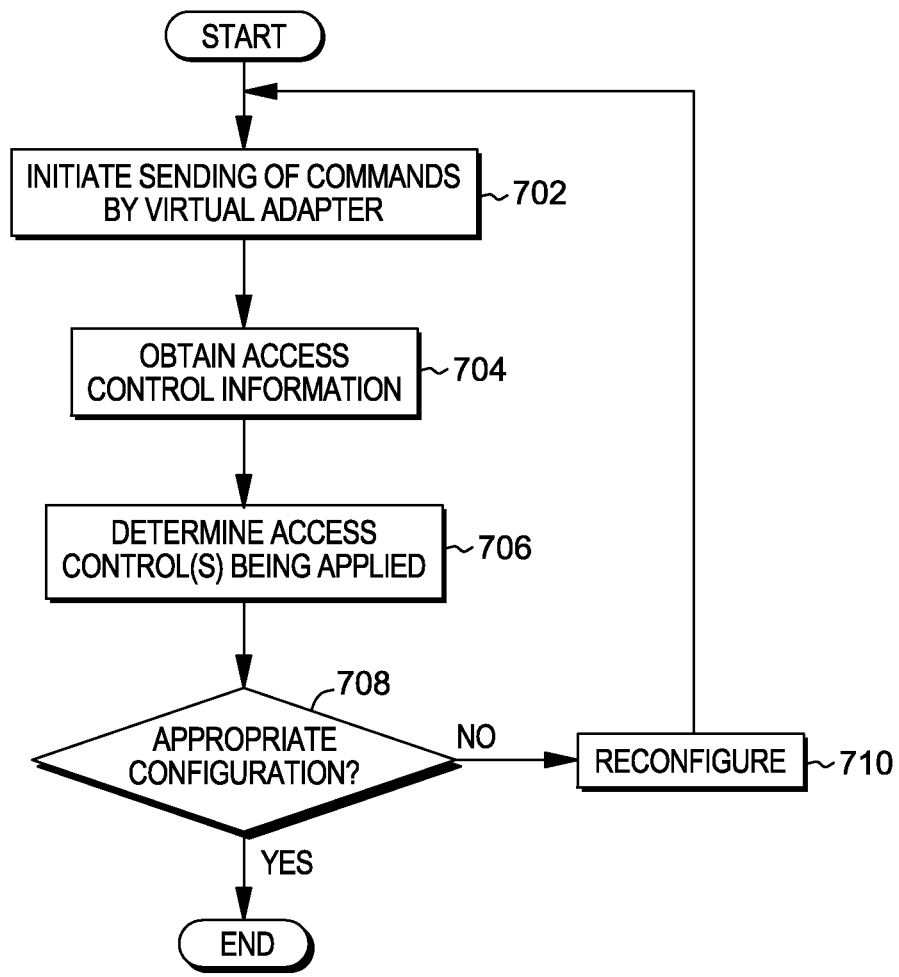
FIG. 7 depicts an example process for determining access controls being enforced to control access by an activated virtual adapter to components of a network, in accordance with aspects described herein.

In addition to the process of FIG. 6 for ascertaining configuration of a virtual adapter based on being activated by a control component, in-band determination and validation of access controls is provided according to aspects described herein. FIG. 7 depicts an example process for determining access controls being enforced by a network in controlling access by an activated virtual adapter to components of the network. The process of FIG. 7 may be performed at least partially by a control component of a computing environment as described herein.

The process begins by the control component of the computing environment initiating sending of requests (commands in this example) over a network of the computing environment by an activated virtual adapter (702). The activated virtual adapter may be activated as described above. It may be hosted on a physical adapter of a host system coupled to the network and may be for use by a guest hosted by the host system in performing data input and output.

The sent requests retrieve access control information from the network. The access control information is indicative of access control(s) enforced by the network (i.e. component(s) thereof) in controlling access by the activated virtual adapter to network component(s) of the network. Controlling access may refer to allowing access or denying access. Thus, the access controls may enable or prevent access by the activated virtual adapter to at least some network components.

Initiating in this context may include the control component providing indication(s) to the physical adapter that the requests be sent by the virtual adapter. This initiating may be performed absent any involvement of the guest that is to use the virtual adapter for data I/O.

Based on the initiating, the control component obtains the access control information from (704) the physical adapter. For instance, responses to the requests sent into the network may be received by the virtual adapter and information thereof may be provided to, and obtained by, the control element. The control component can determine, based on that information, the one or more access controls being enforced by the network in controlling access by the activated virtual adapter to the one or more network components (706).

In some specific embodiments, the initiating initiates sending of a request to log the activated virtual adapter into the network. Based on logging the virtual adapter into the network, the initiating may also initiate sending of a request to determine remote ports of the network that are accessible to the activated virtual adapter. The retrieved access control information may indicate/identify the remote port(s) of the network that are accessible to the activated virtual adapter. The initiating may also initiate sending a request to log into a remote port of the indicated remote port(s) accessible to the activated virtual adapter.

The one or more network components may be components of a storage area network and the remote port may be a remote port of a storage device hosting a storage array. A logical unit of the storage array may be indicated by a logical unit number that may be retrieved as part of the retrieved access control information. Additionally or alternatively, the retrieved access control information may include logical unit number masking data or zoning configuration data for controlling zones of the storage area network. The determining of the access controls may determine one or more storage arrays to which the activated virtual adapter has access, or determine one or more zones of which the activated virtual adapter is a member. Additionally, a request of the initiated requests may include a logical unit number interrogation request to interrogate a storage array with which an accessible remote port is associated.

Based on at least some of the obtained access control information, it may be determined whether the access controls represent an appropriate configuration for controlling access by the activated virtual adapter to the one or more network components (708). This is may be effected by comparing a set of desired or modeled access controls to the determined one or more access controls being enforced. If it is determined that the configuration is inappropriate, the activated virtual adapter and/or network component(s) of the network may be reconfigured (710). In some examples, as before, this may be performed automatically by a component, such as the control component, or by an administrator or other user. Also as above, this reconfiguration may require that the virtual adapter and/or other network components be deactivated. In any case, the process of FIG. 7 may be repeated, optionally after reactivating the virtual adapter (see FIG. 6). Thus, the process may return to (702) to again initiate sending of commands by the virtual adapter.

Returning to (708), if the configuration is appropriate, then the process ends. All, some, or none of the aspects of FIG. 7 may be performed while the guest remains inactive, prior to an initial program load of the guest.

Additionally, the aspects of FIG. 7 may all be performed by the control component absent any communication between the control component and the guest. In some cases, the process of FIG. 7 is performed for multiple virtual adapters hosted on one or more physical adapters, with each virtual adapter of the plurality of virtual adapters being provided for a respective guest of a plurality of guests of the host system. All or some of the guests may remain inactive during this process.

Also as above, in cases where the guest is active for some or all of the process of FIG. 7, the guest may also be actively using the virtual adapter. The processing of FIG. 7 by the control component (e.g. the initiating, obtaining, and determining) may be non-disruptive of use of the activated virtual adapter by the guest in performing data input and output. Furthermore, the guest may use the activated virtual adapter in performing data input and output non-disruptive of this processing by the control component.

Figure 8:
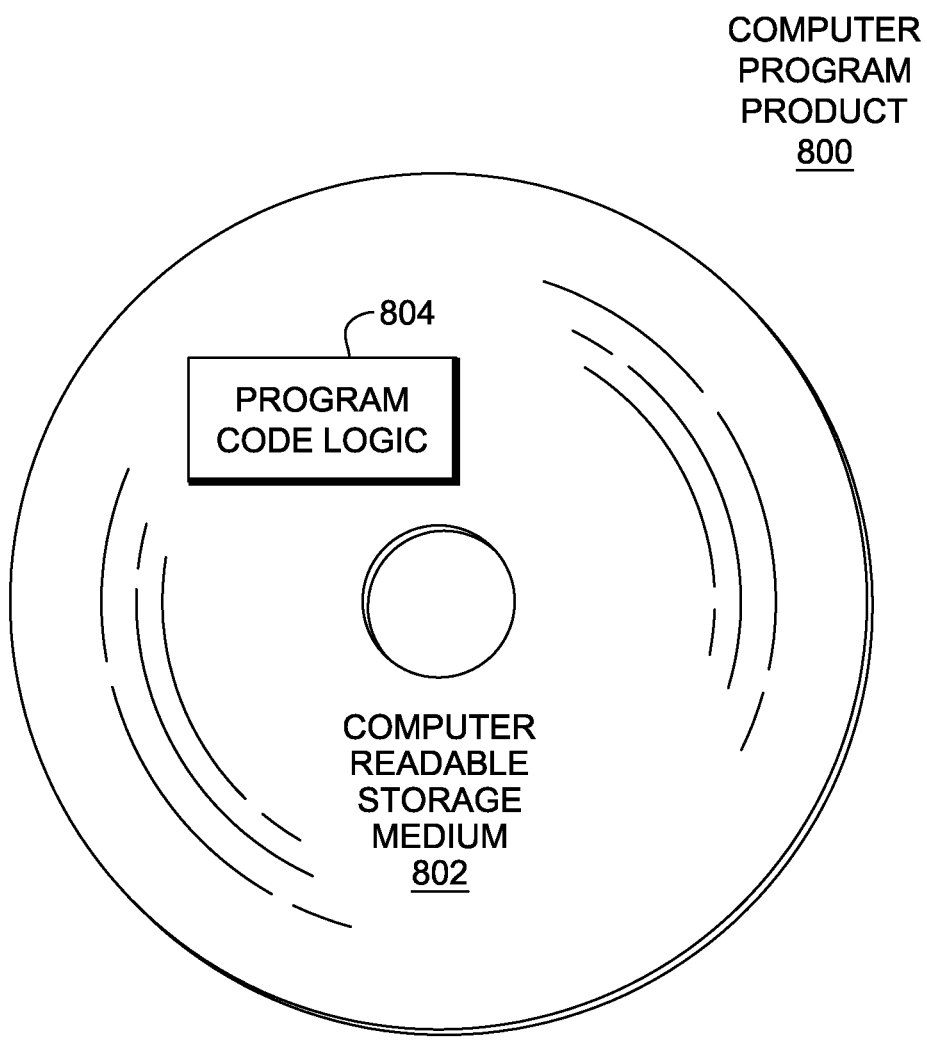
FIG. 8 depicts one embodiment of a computer program product.

The present invention may be a system, a method, and/or a computer program product. The computer program product may include a computer readable storage medium (or media) having computer readable program instructions thereon for causing a processor to carry out aspects of the present invention. Referring to FIG. 8, in one example, a computer program product 800 includes, for instance, one or more non-transitory computer readable storage media 802 to store computer readable program code means, logic and/or instructions 804 thereon to provide and facilitate one or more embodiments.

A computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Yet further, other limits may be provided and/or used in differing ways. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 9:
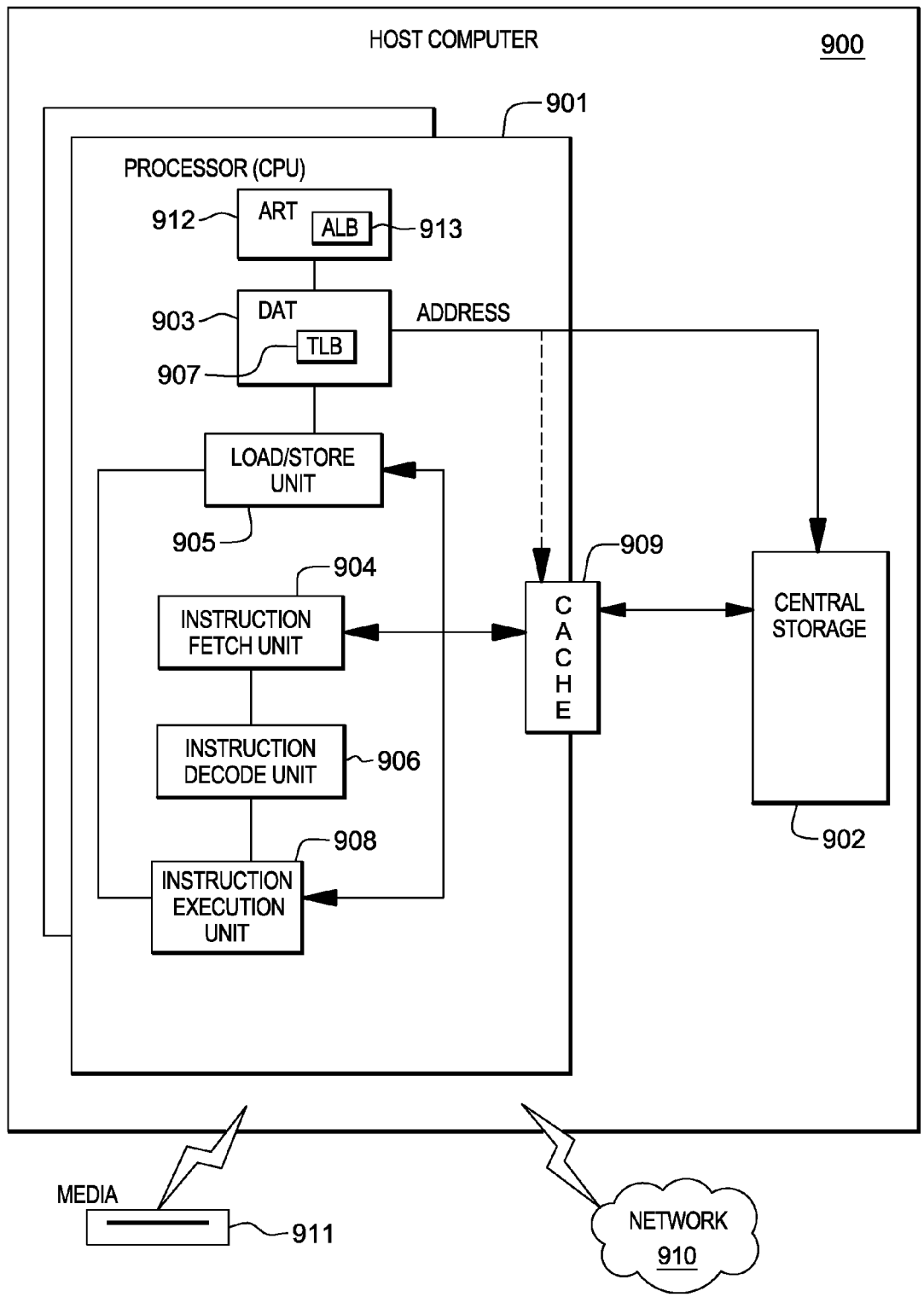
FIG. 9 depicts one embodiment of a host computer system.

Referring to FIG. 9, representative components of a Host Computer system 900 to implement one or more embodiments are portrayed. The representative host computer 900 comprises one or more CPUs 901 in communication with computer memory (i.e., central storage) 902, as well as I/O interfaces to storage media devices 911 and networks 910 for communicating with other computers or SANs and the like. The CPU 901 is compliant with an architecture having an architected instruction set and architected functionality. The CPU 901 may have access register translation (ART) 912, which includes an ART lookaside buffer (ALB) 913, for selecting an address space to be used by dynamic address translation (DAT) 903 for transforming program addresses (virtual addresses) into real addresses of memory. A DAT typically includes a translation lookaside buffer (TLB) 907 for caching translations so that later accesses to the block of computer memory 902 do not require the delay of address translation. Typically, a cache 909 is employed between computer memory 902 and the processor 901. The cache 909 may be hierarchical having a large cache available to more than one CPU and smaller, faster (lower level) caches between the large cache and each CPU. In some implementations, the lower level caches are split to provide separate low level caches for instruction fetching and data accesses.

In one embodiment, an instruction is fetched from memory 902 by an instruction fetch unit 904 via a cache 909. The instruction is decoded in an instruction decode unit 906 and dispatched (with other instructions in some embodiments) to instruction execution unit or units 908. Typically several execution units 908 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 902, a load/store unit 905 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short).

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture, bits are numbered in a left-to-right sequence. In the z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. In one example, bits 8-31 and 1-31 apply to addresses that are in a location (e.g., register) that is 32 bits wide, whereas bits 40-63 and 33-63 apply to addresses that are in a 64-bit wide location. Within any other fixed-length format of multiple bytes, the bits making up the format are consecutively numbered starting from 0. For purposes of error detection, and preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, 16, and 32 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. An octoword is a group of 32 consecutive bytes on a 32-byte boundary. When storage addresses designate halfwords, words, doublewords, quadwords, and octowords, the binary representation of the address contains one, two, three, four, or five rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one example, the embodiment may be practiced by software (sometimes referred to licensed internal code, firmware, micro-code, milli-code, pico-code and the like, any of which would be consistent with one or more embodiments). Referring to FIG. 9, software program code which embodies one or more aspects may be accessed by processor 901 of the host system 900 from long-term storage media devices 911, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 902 or storage of one computer system over a network 910 to other computer systems for use by users of such other systems.

The software program code includes an operating system which controls the function and interaction of the various computer components and one or more application programs. Program code is normally paged from storage media device 911 to the relatively higher-speed computer storage 902 where it is available for processing by processor 901. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 10:
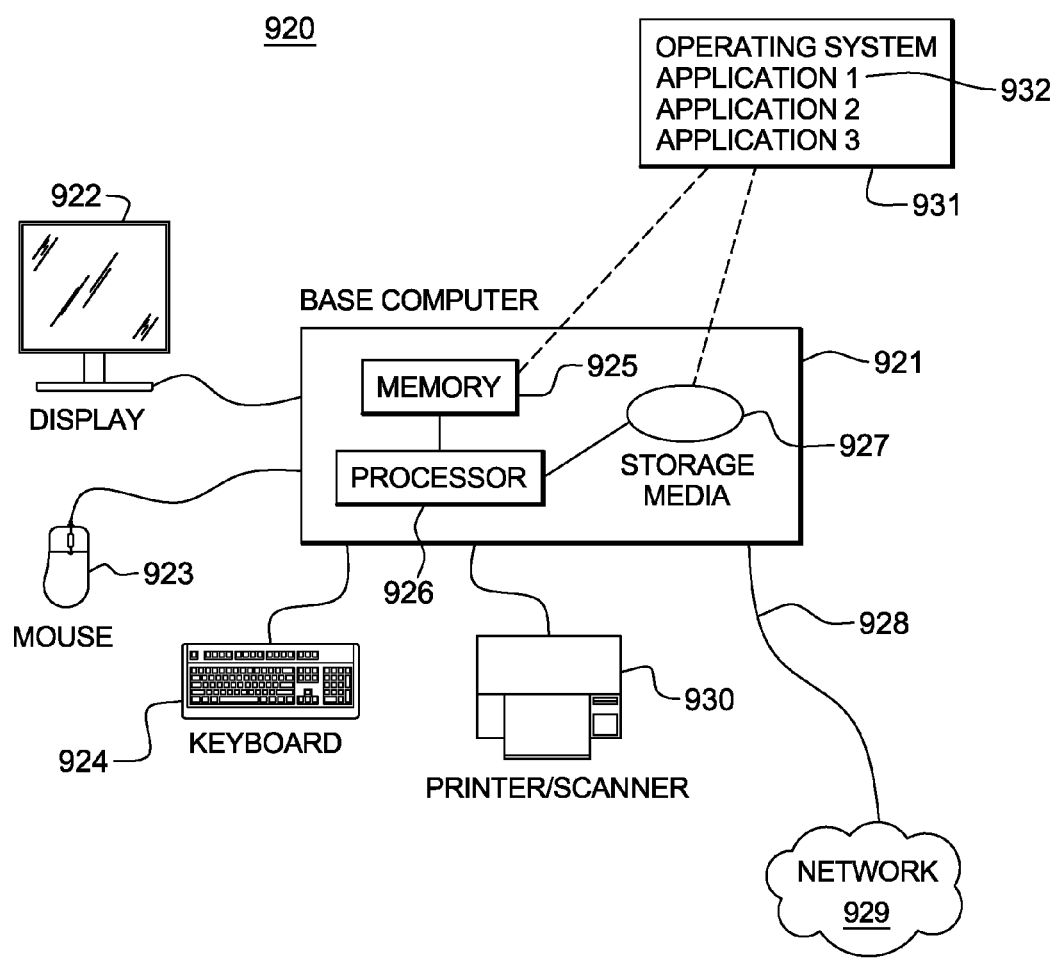
FIG. 10 depicts a further example of a computer system.

FIG. 10 illustrates a representative workstation or server hardware system in which one or more embodiments may be practiced. The system 920 of FIG. 10 comprises a representative base computer system 921, such as a personal computer, a workstation or a server, including optional peripheral devices. The base computer system 921 includes one or more processors 926 and a bus employed to connect and enable communication between the processor(s) 926 and the other components of the system 921 in accordance with known techniques. The bus connects the processor 926 to memory 925 and long-term storage 927 which can include a hard drive (including any of magnetic media, CD, DVD and Flash Memory for example) or a tape drive for example. The system 921 might also include a user interface adapter, which connects the microprocessor 926 via the bus to one or more interface devices, such as a keyboard 924, a mouse 923, a printer/scanner 930 and/or other interface devices, which can be any user interface device, such as a touch sensitive screen, digitized entry pad, etc. The bus also connects a display device 922, such as an LCD screen or monitor, to the microprocessor 926 via a display adapter.

The system 921 may communicate with other computers or networks of computers by way of a network adapter capable of communicating 928 with a network 929. Example network adapters are communications channels, token ring, Ethernet or modems. Alternatively, the system 921 may communicate using a wireless interface, such as a CDPD (cellular digital packet data) card. The system 921 may be associated with such other computers in a Local Area Network (LAN) or a Wide Area Network (WAN), or the system 921 can be a client in a client/server arrangement with another computer, etc. All of these configurations, as well as the appropriate communications hardware and software, are known in the art.

Figure 11:
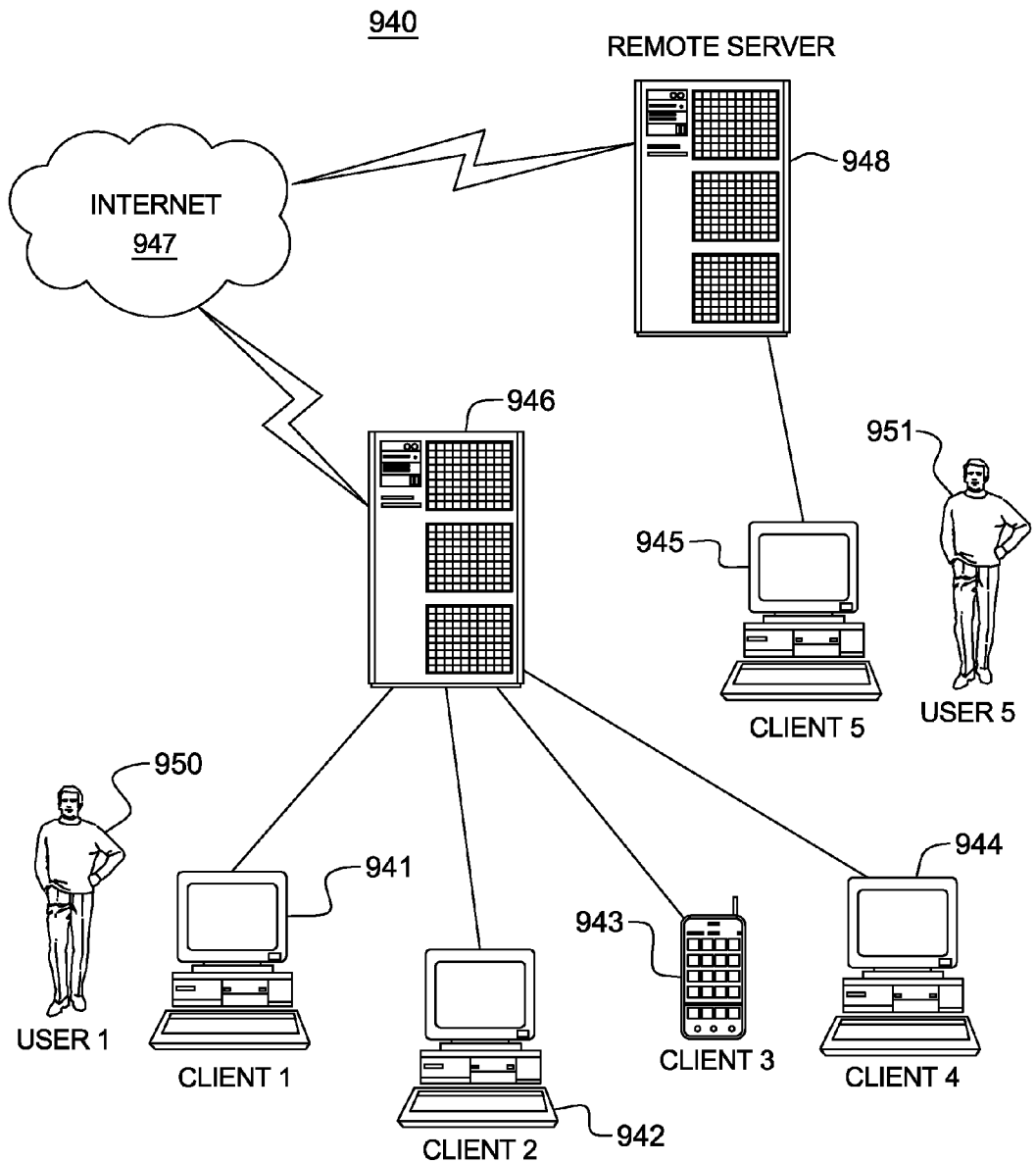
FIG. 11 depicts another example of a computer system comprising a computer network.

FIG. 11 illustrates a data processing network 940 in which one or more embodiments may be practiced. The data processing network 940 may include a plurality of individual networks, such as a wireless network and a wired network, each of which may include a plurality of individual workstations 941, 942, 943, 944. Additionally, as those skilled in the art will appreciate, one or more LANs may be included, where a LAN may comprise a plurality of intelligent workstations coupled to a host processor.

Still referring to FIG. 11, the networks may also include mainframe computers or servers, such as a gateway computer (client server 946) or application server (remote server 948 which may access a data repository and may also be accessed directly from a workstation 945). A gateway computer 946 serves as a point of entry into each individual network. A gateway is needed when connecting one networking protocol to another. The gateway 946 may be preferably coupled to another network (the Internet 947 for example) by means of a communications link. The gateway 946 may also be directly coupled to one or more workstations 941, 942, 943, 944 using a communications link. The gateway computer may be implemented utilizing an IBM eServer System z server available from International Business Machines Corporation.

Referring concurrently to FIG. 10 and FIG. 11, software programming code 931 which may embody one or more aspects may be accessed by the processor 926 of the system 920 from long-term storage media 927, such as a CD-ROM drive or hard drive. The software programming code may be embodied on any of a variety of known media for use with a data processing system, such as a diskette, hard drive, or CD-ROM. The code may be distributed on such media, or may be distributed to users 950, 951 from the memory or storage of one computer system over a network to other computer systems for use by users of such other systems.

Alternatively, the programming code may be embodied in the memory 925, and accessed by the processor 926 using the processor bus. Such programming code includes an operating system which controls the function and interaction of the various computer components and one or more application programs 932. Program code is normally paged from storage media 927 to high-speed memory 925 where it is available for processing by the processor 926. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 12:
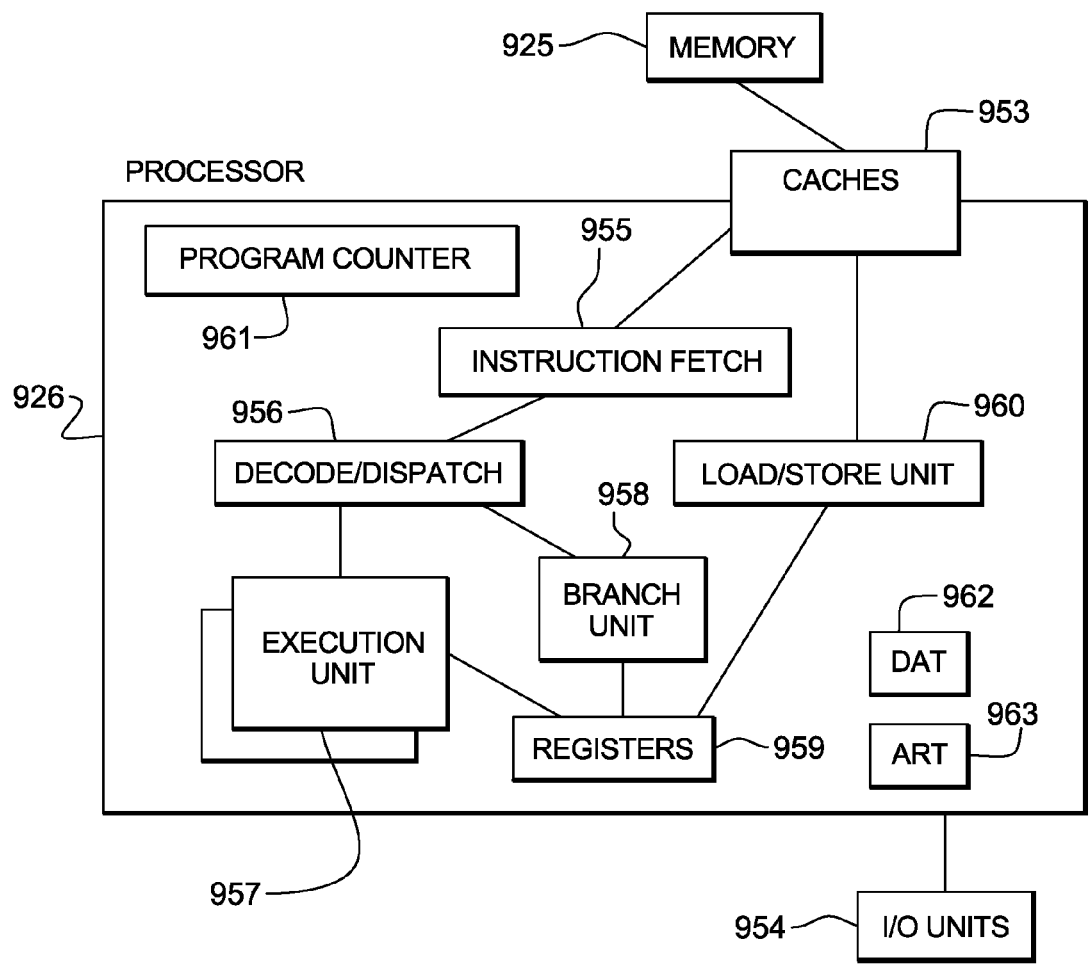
FIG. 12 depicts one embodiment of various elements of a computer system.

Referring to FIG. 12, an exemplary processor embodiment is depicted for processor 926. Typically one or more levels of cache 953 are employed to buffer memory blocks in order to improve processor performance. The cache 953 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 925 of a processor system is often referred to as a cache. In a processor system having 4 levels of cache 953, main storage 925 is sometimes referred to as the level 5 (L5) cache since it is typically faster and only holds a portion of the non-volatile storage (DASD, tape etc) that is available to a computer system. Main storage 925 "caches" pages of data paged in and out of the main storage 925 by the operating system.

A program counter (instruction counter) 961 keeps track of the address of the current instruction to be executed. A program counter in a z/Architecture processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. The Program counter 961 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 955 is employed to fetch instructions on behalf of the processor 926. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 926. In an embodiment, the fetched instruction(s) are passed to a dispatch unit 956 of the fetch unit. The dispatch unit decodes the instruction(s) and forwards information about the decoded instruction(s) to appropriate units 957, 958, 960. An execution unit 957 will typically receive information about decoded arithmetic instructions from the instruction fetch unit 955 and will perform arithmetic operations on operands according to the opcode of the instruction. Operands are provided to the execution unit 957 preferably either from memory 925, architected registers 959 or from an immediate field of the instruction being executed. Results of the execution, when stored, are stored either in memory 925, registers 959 or in other machine hardware (such as control registers, PSW registers and the like).

Virtual addresses are transformed into real addresses using dynamic address translation 962 and, optionally, using access register translation 963.

Figure 13A:
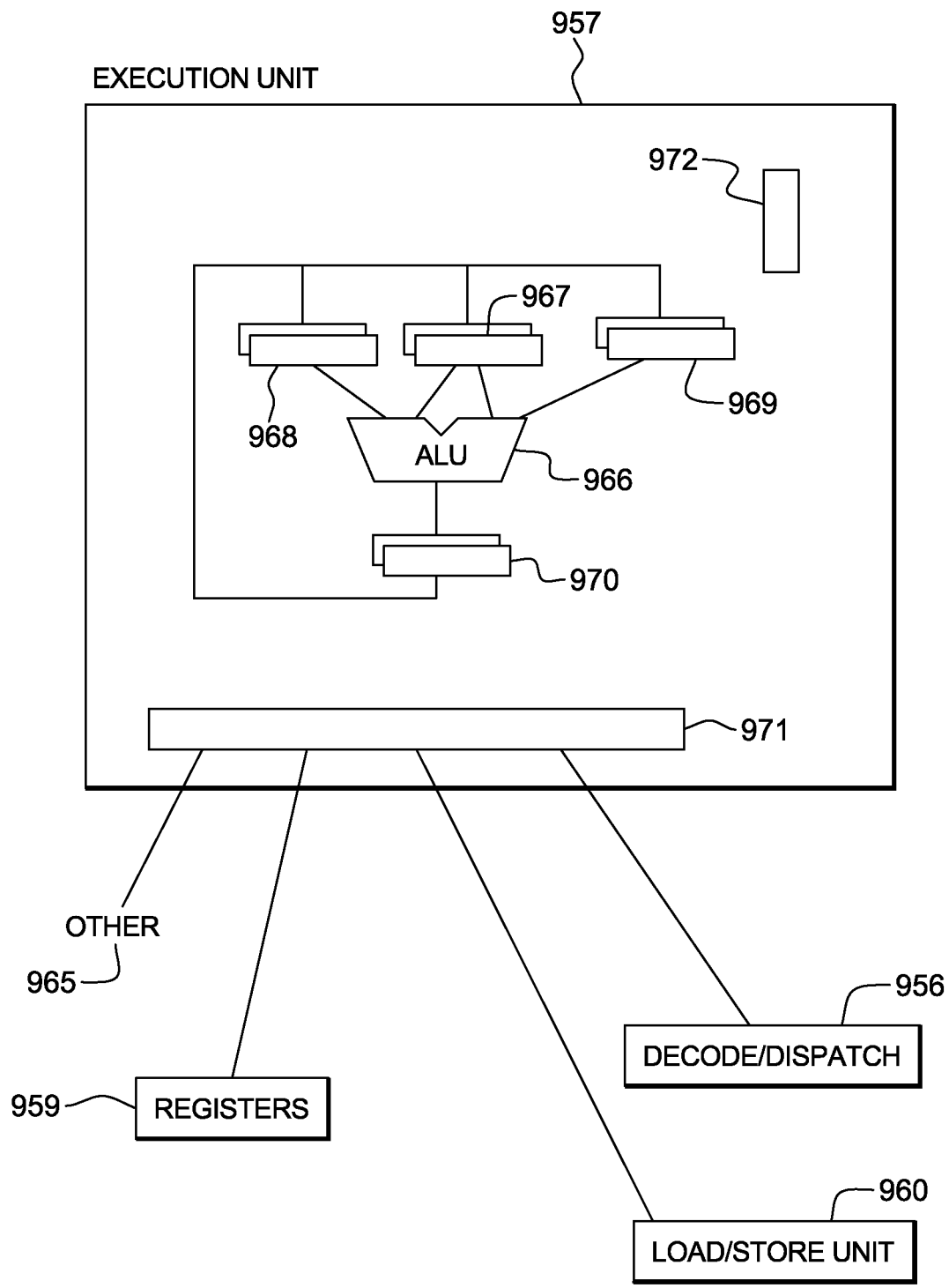
FIG. 13A depicts one embodiment of the execution unit of the computer system of FIG. 12.

A processor 926 typically has one or more units 957, 958, 960 for executing the function of the instruction. Referring to FIG. 13A, an execution unit 957 may communicate 971 with architected general registers 959, a decode/dispatch unit 956, a load store unit 960, and other 965 processor units by way of interfacing logic 971. An execution unit 957 may employ several register circuits 967, 968, 969 to hold information that the arithmetic logic unit (ALU) 966 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 972 including condition codes and recovery support logic for example. Typically the result of an ALU operation is held in an output register circuit 970 which can forward the result to a variety of other processing functions. There are many arrangements of processor units, the present description is only intended to provide a representative understanding of one embodiment.

An ADD instruction for example would be executed in an execution unit 957 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 957 on operands found in two registers 959 identified by register fields of the instruction.

The execution unit 957 performs the arithmetic addition on two operands and stores the result in a third operand where the third operand may be a third register or one of the two source registers. The execution unit preferably utilizes an Arithmetic Logic Unit (ALU) 966 that is capable of performing a variety of logical functions such as Shift, Rotate, And, Or and XOR as well as a variety of algebraic functions including any of add, subtract, multiply, divide. Some ALUs 966 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 13B:
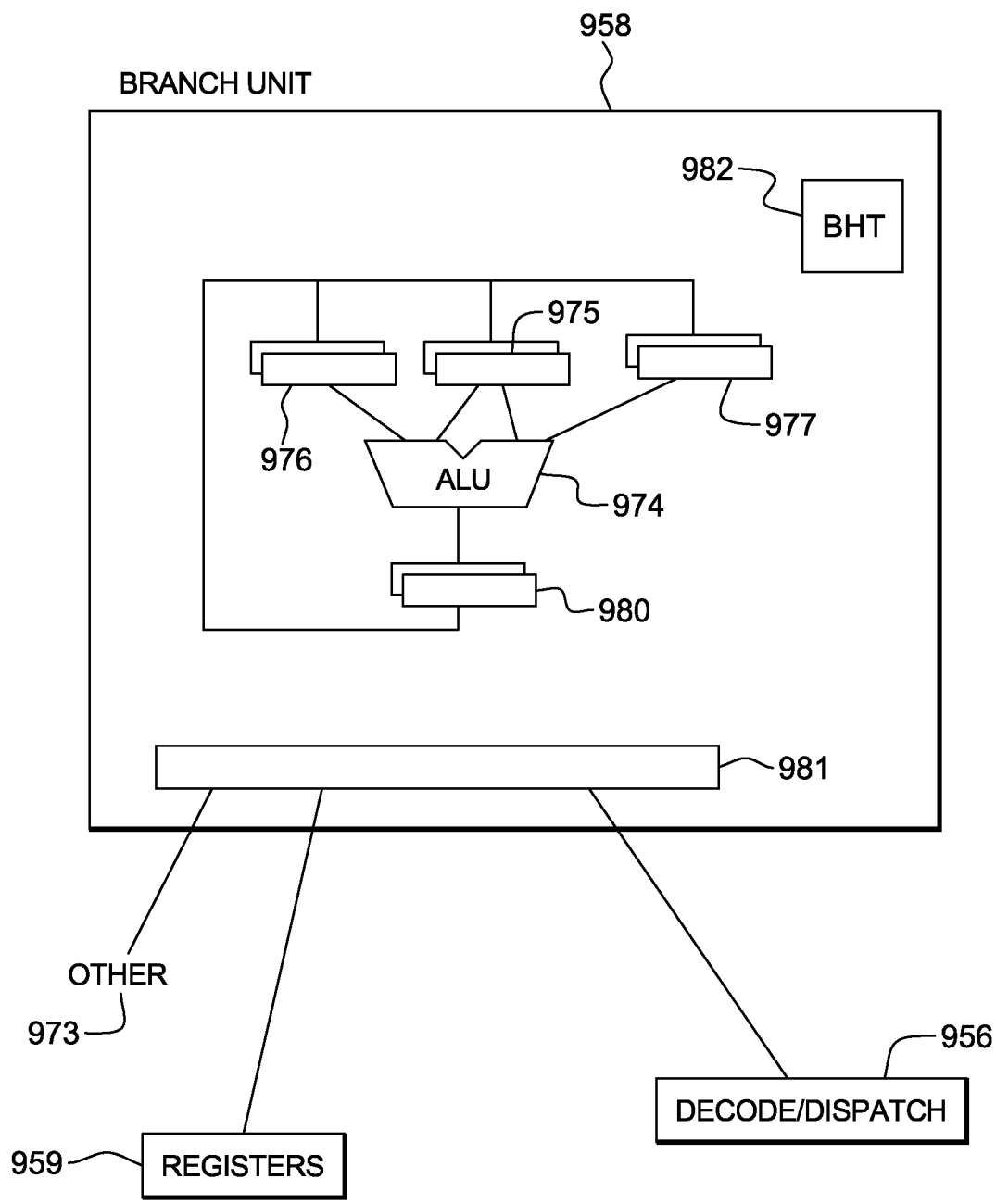
FIG. 13B depicts one embodiment of the branch unit of the computer system of FIG. 12.

Referring to FIG. 13B, branch instruction information for executing a branch instruction is typically sent to a branch unit 958 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 958 may employ an ALU 974 having a plurality of input register circuits 975, 976, 977 and an output register circuit 980. The branch unit 958 may communicate 981 with general registers 959, decode dispatch unit 956 or other circuits 973, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example. Location herein typically implies a location in main memory (main storage) unless otherwise indicated.

Figure 13C:
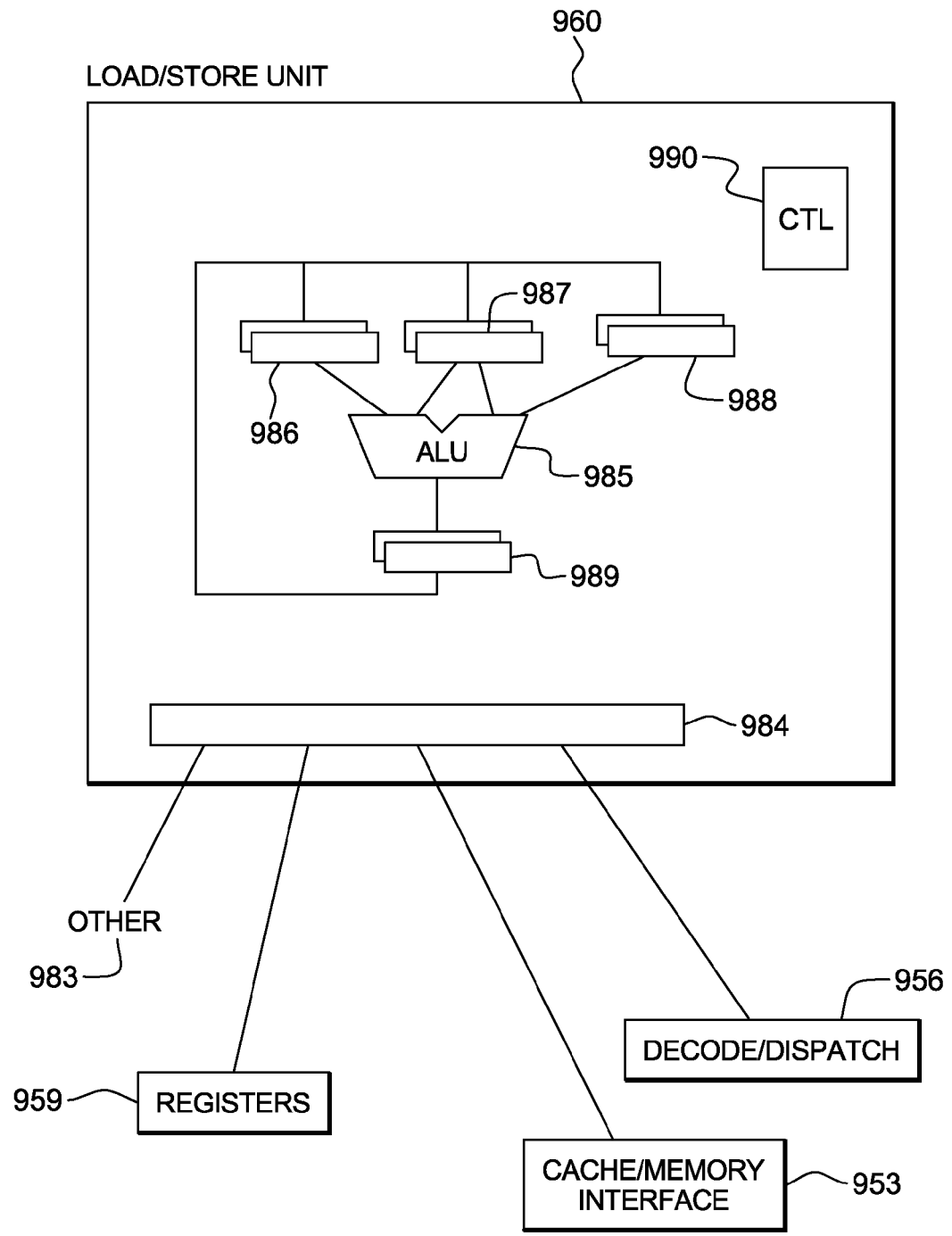
FIG. 13C depicts one embodiment of the load/store unit of the computer system of FIG. 12.

Referring to FIG. 13C, a processor accesses storage using a load/store unit 960. The load/store unit 960 may perform a load operation by obtaining the address of the target operand in memory 953 and loading the operand in a register 959 or another memory 953 location, or may perform a store operation by obtaining the address of the target operand in memory 953 and storing data obtained from a register 959 or another memory 953 location in the target operand location in memory 953. The load/store unit 960 may be speculative and may access memory in a sequence that is out-of-order relative to instruction sequence, however the load/store unit 960 is to maintain the appearance to programs that instructions were executed in order. A load/store unit 960 may communicate 984 with general registers 959, decode/dispatch unit 956, cache/memory interface 953 or other elements 983 and comprises various register circuits 986, 987, 988 and 989, ALUs 985 and control logic 990 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 954 (FIG. 11) provide the processor with means for attaching to peripheral devices including tape, disc, printers, displays, and networks for example. I/O units are often presented to the computer program by software drivers. In mainframes, such as the System z from IBM®, channel adapters and open system adapters are I/O units of the mainframe that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more embodiments, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture IBM® Server, or alternatively in machines executing other architectures. They can be emulated in the existing and in future IBM® mainframe servers and on other machines of IBM® (e.g., Power Systems servers and System x Servers). They can be executed in machines running Linux on a wide variety of machines using hardware manufactured by IBM®, Intel®, AMD, and others. Besides execution on that hardware under a z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to, U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated by reference herein in its entirety; and many others, illustrate a variety of known ways to achieve emulation of an instruction format architected for a different machine for a target machine available to those skilled in the art.

Figure 14:
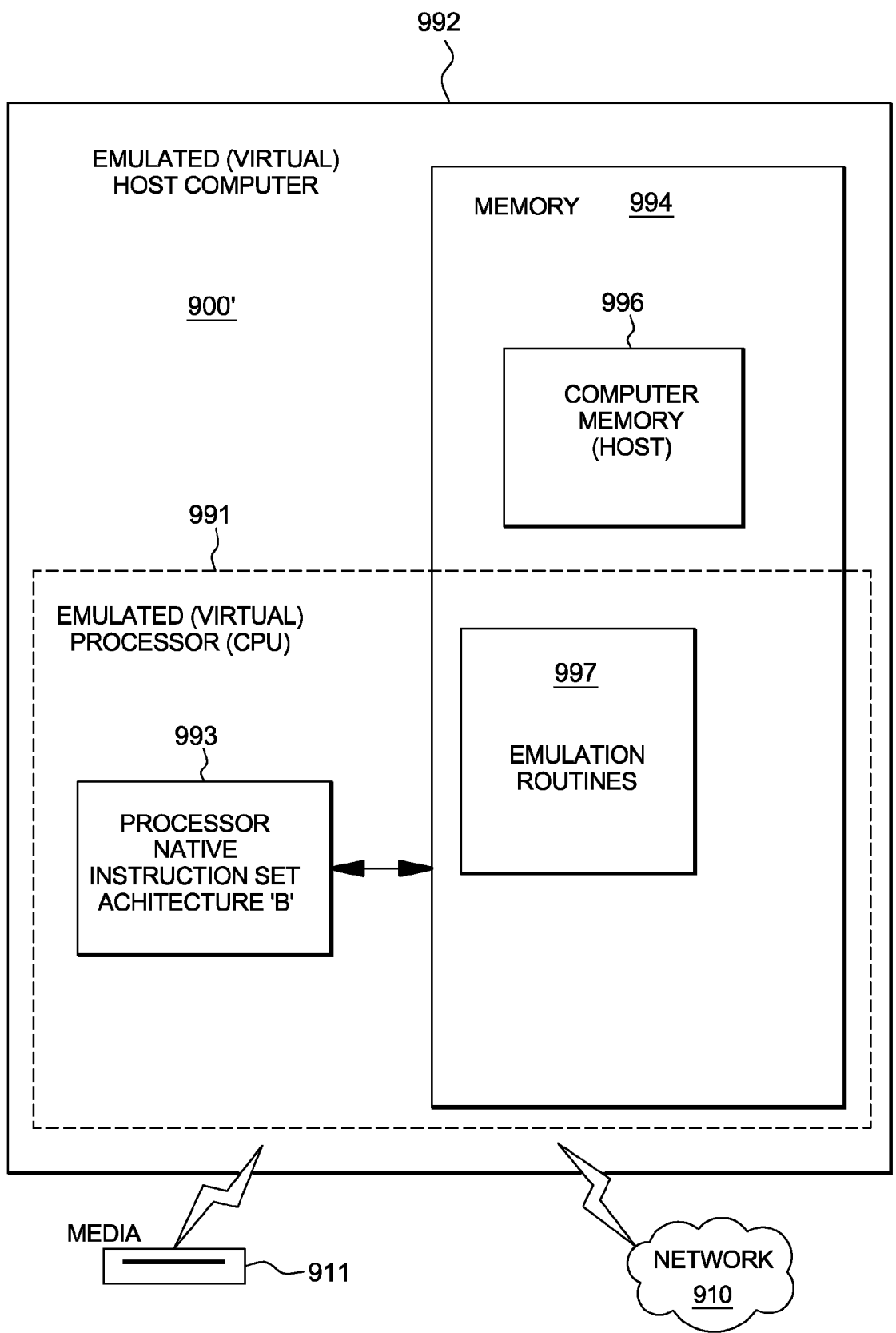
FIG. 14 depicts one embodiment of an emulated host computer system.

In FIG. 14, an example of an emulated host computer system 992 is provided that emulates a host computer system 900' of a host architecture. In the emulated host computer system 992, the host processor (CPU) 991 is an emulated host processor (or virtual host processor) and comprises an emulation processor 993 having a different native instruction set architecture than that of the processor 991 of the host computer 900'. The emulated host computer system 992 has memory 994 accessible to the emulation processor 993. In the example embodiment, the memory 994 is partitioned into a host computer memory 996 portion and an emulation routines 997 portion. The host computer memory 996 is available to programs of the emulated host computer 992 according to host computer architecture. The emulation processor 993 executes native instructions of an architected instruction set of an architecture other than that of the emulated processor 991, the native instructions obtained from emulation routines memory 997, and may access a host instruction for execution from a program in host computer memory 996 by employing one or more instruction(s) obtained in a sequence & access/decode routine which may decode the host instruction(s) accessed to determine a native instruction execution routine for emulating the function of the host instruction accessed. Other facilities that are defined for the host computer system 900' architecture may be emulated by architected facilities routines, including such facilities as general purpose registers, control registers, dynamic address translation and I/O subsystem support and processor cache, for example. The emulation routines may also take advantage of functions available in the emulation processor 993 (such as general registers and dynamic translation of virtual addresses) to improve performance of the emulation routines. Special hardware and off-load engines may also be provided to assist the processor 993 in emulating the function of the host computer 900'.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 15:
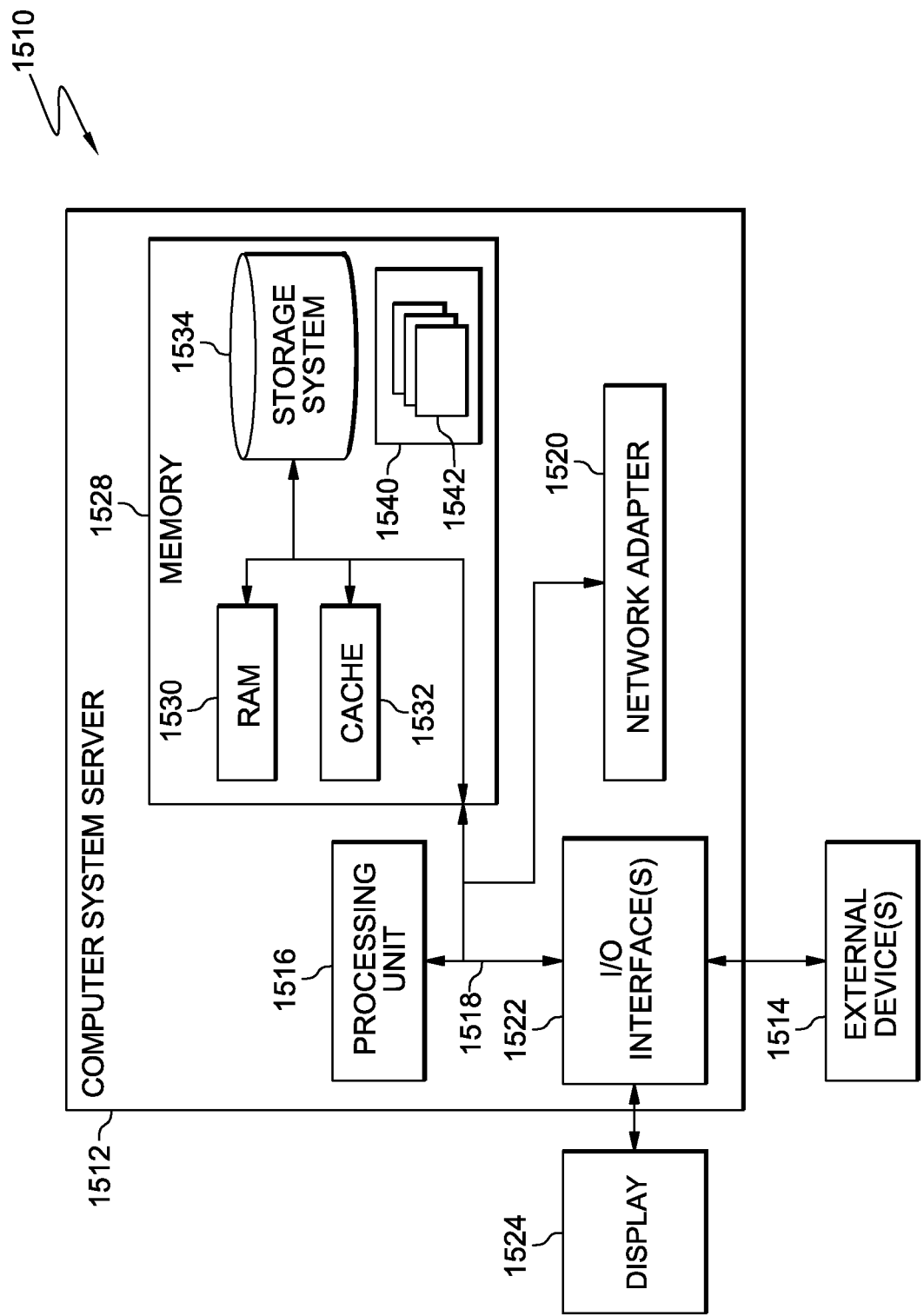
FIG. 15 depicts one embodiment of a cloud computing node.

Referring now to FIG. 15, a schematic of an example of a cloud computing node is shown. Cloud computing node 1510 is only one example of a suitable cloud computing node and is not intended to suggest any limitation as to the scope of use or functionality of embodiments of the invention described herein. Regardless, cloud computing node 1510 is capable of being implemented and/or performing any of the functionality set forth hereinabove.

In cloud computing node 1510 there is a computer system/server 1512, which is operational with numerous other general purpose or special purpose computing system environments or configurations. Examples of well-known computing systems, environments, and/or configurations that may be suitable for use with computer system/server 1512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 1512 in cloud computing node 1510 is shown in the form of a general-purpose computing device. The components of computer system/server 1512 may include, but are not limited to, one or more processors or processing units 1516, a system memory 1528, and a bus 1518 that couples various system components including system memory 1528 to processor 1516.

Bus 1518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1512 typically includes a variety of computer system readable media. Such media may be any available media that is accessible by computer system/server 1512, and it includes both volatile and non-volatile media, removable and non-removable media.

System memory 1528 can include computer system readable media in the form of volatile memory, such as random access memory (RAM) 1530 and/or cache memory 1532. Computer system/server 1512 may further include other removable/non-removable, volatile/non-volatile computer system storage media. By way of example only, storage system 1534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1518 by one or more data media interfaces. As will be further depicted and described below, memory 1528 may include at least one program product having a set (e.g., at least one) of program modules that are configured to carry out the functions of embodiments of the invention.

Program/utility 1540, having a set (at least one) of program modules 1542, may be stored in memory 1528 by way of example, and not limitation, as well as an operating system, one or more application programs, other program modules, and program data. Each of the operating system, one or more application programs, other program modules, and program data or some combination thereof, may include an implementation of a networking environment. Program modules 1542 generally carry out the functions and/or methodologies of embodiments of the invention as described herein.

Computer system/server 1512 may also communicate with one or more external devices 1514 such as a keyboard, a pointing device, a display 1524, etc.; one or more devices that enable a user to interact with computer system/server 1512; and/or any devices (e.g., network card, modem, etc.) that enable computer system/server 1512 to communicate with one or more other computing devices. Such communication can occur via Input/Output (I/O) interfaces 1522. Still yet, computer system/server 1512 can communicate with one or more networks such as a local area network (LAN), a general wide area network (WAN), and/or a public network (e.g., the Internet) via network adapter 1520. As depicted, network adapter 1520 communicates with the other components of computer system/server 1512 via bus 1518. It should be understood that although not shown, other hardware and/or software components could be used in conjunction with computer system/server 1512. Examples, include, but are not limited to: microcode, device drivers, redundant processing units, external disk drive arrays, RAID systems, tape drives, and data archival storage systems, etc.

Figure 16:
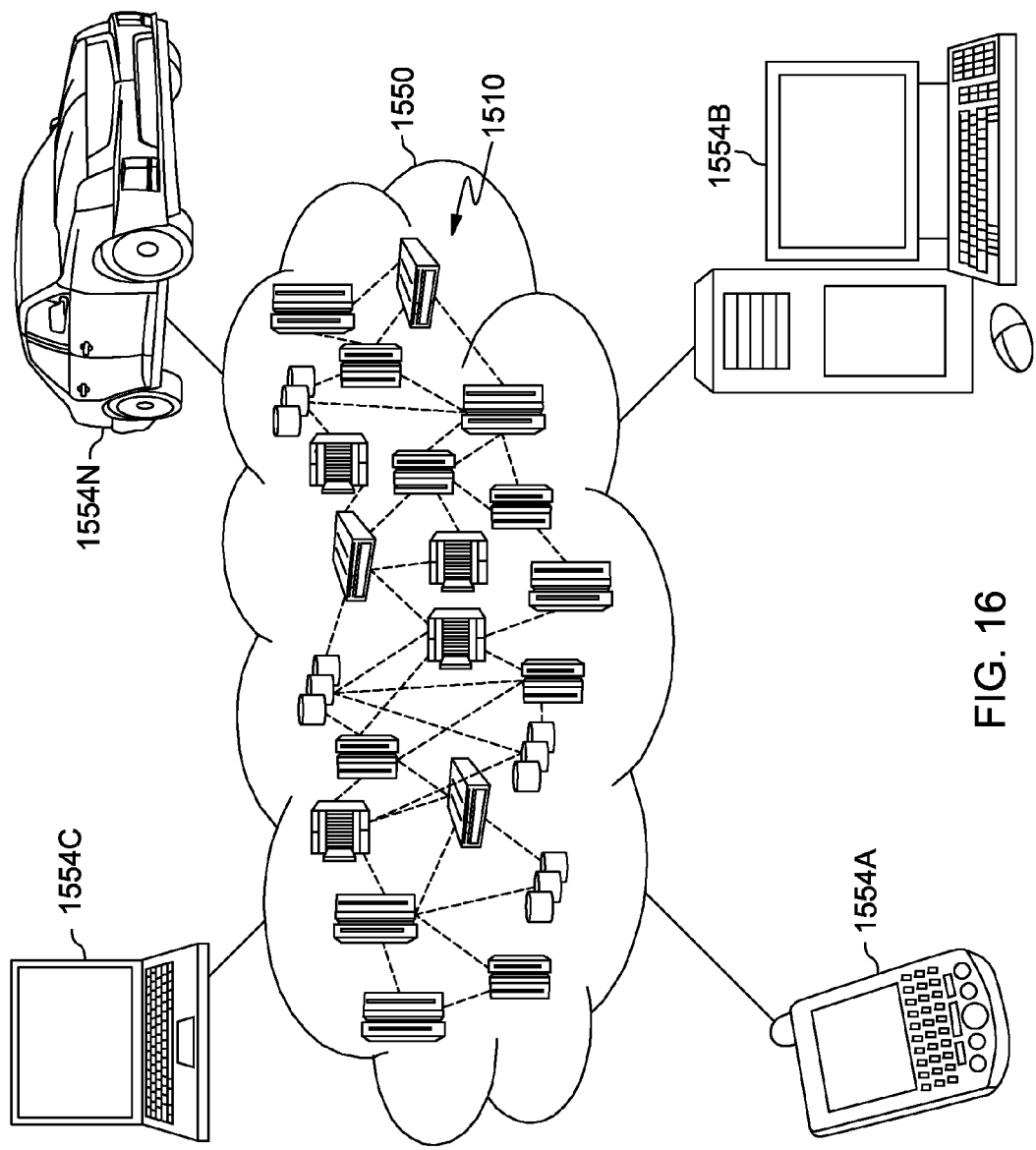
FIG. 16 depicts on embodiment of a cloud computing environment.

Referring now to FIG. 16, illustrative cloud computing environment 1550 is depicted. As shown, cloud computing environment 1550 comprises one or more cloud computing nodes 1510 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1510 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 16 are intended to be illustrative only and that computing nodes 1510 and cloud computing environment 1550 can communicate with any type of computerized device over any type of network and/or network addressable connection (e.g., using a web browser).

Figure 17:
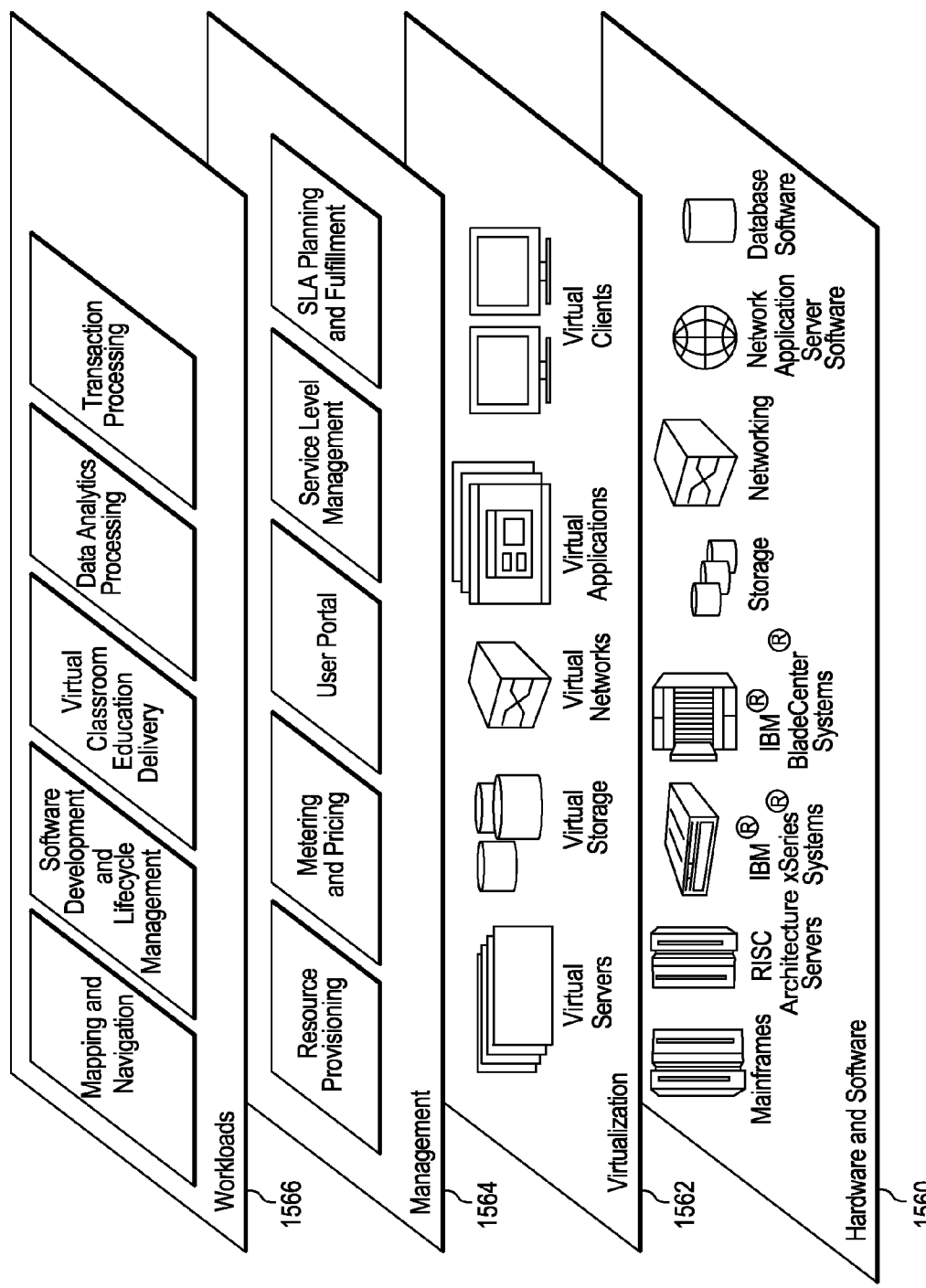
FIG. 17 depicts one example of abstraction model layers.

Referring now to FIG. 17, a set of functional abstraction layers provided by cloud computing environment 1550 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 1560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1562 provides an abstraction layer from which the following examples of virtual entities may be provided: virtual servers; virtual storage; virtual networks, including virtual private networks; virtual applications and operating systems; and virtual clients.

In one example, management layer 1564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1566 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product, comprising:
   a non-transitory computer readable storage medium readable by a processing circuit and storing instructions for execution by the processing circuit for performing a method comprising:

initiating, by a control component of a computing environment, sending of one or more requests over a network of the computing environment by an activated virtual adapter, the activated virtual adapter being hosted on a physical adapter of a host system coupled to the network, the activated virtual adapter for use by a guest, hosted by the host system, in performing data input and output, wherein the one or more requests retrieve access control information from the network, the access control information indicative of one or more access controls enforced by the network in controlling access by the activated virtual adapter to one or more network components of the network, and wherein the initiating comprises the control component providing one or more indications to the physical adapter, absent involvement of the guest, that the one or more requests be sent by the virtual adapter;

based on the initiating, obtaining, by the control component, the access control information from the physical adapter; and determining, by the control component, based on the obtained access control information, the one or more access controls being enforced by the network in controlling access by the activated virtual adapter to the one or more network components, wherein the initiating initiates sending a first request, of the one or more requests, to determine remote ports of the network that are accessible to the activated virtual adapter, wherein the retrieved access control information comprises an indication of one or more remote ports of the network that are accessible to the activated virtual adapter, wherein the initiating initiates sending a second request, of the one or more requests, to log into a remote port of the indicated one or more remote ports accessible to the activated virtual adapter, and wherein the remote port is a remote port of storage device hosting a storage array, wherein a logical unit of the storage array is indicated by a logical unit number, and wherein a third request of the one or more requests comprises a logical unit number interrogation request.

2. The computer program product of claim 1, wherein the initiating and the obtaining by the activated virtual adapter is non-disruptive of use of the activated virtual adapter by the guest in performing data input and output, and wherein use of the activated virtual adapter in performing data input and output by the guest is non-disruptive of the initiating and the obtaining by the control component.

3. The computer program product of claim 1, wherein the initiating, obtaining, and determining occur prior to an initial program load of the guest.

4. The computer program product of claim 1, wherein the host system is a separate system from the control component, wherein the host system executes on a first set of one or more processors and the control component executes on a second set of one or more processors different from the first set of one or more processors.

5. The computer program product of claim 1, wherein the initiating initiates sending of a request, of the one or more requests, to log the activated virtual adapter into the network.

6. The computer program product of claim 1, wherein the one or more network components comprise a storage area network, and wherein the retrieved access control information comprises logical unit number masking data or zoning configuration data for controlling zones of the storage area network, wherein the determining determines one or more storage arrays to which the activated virtual adapter has access, or determines one or more zones of which the activated virtual adapter is a member.

7. The computer program product of claim 1, wherein the determined one or more access controls comprise an access control preventing access by the activated virtual adapter to a network component of the one or more network components.

8. The computer program product of claim 1, wherein the method further comprises:

determining, based on at least some of the obtained access control information, whether an access control of the determined one or more access controls is appropriate for controlling access by the activated virtual adapter to the one or more network components, wherein the determining is performed while the guest remains inactive; and based on determining that the access control is not appropriate for controlling access by the activated virtual adapter to the one or more network components, reconfiguring the activated virtual adapter or a network component of the network prior to activating the guest.

9. A system comprising:

a memory; and a processor in communications with the memory, wherein the computer system is configured to perform a method, the method comprising:

initiating, by a control component of a computing environment, sending of one or more requests over a network of the computing environment by an activated virtual adapter, the activated virtual adapter being hosted on a physical adapter of a host system coupled to the network, the activated virtual adapter for use by a guest, hosted by the host system, in performing data input and output, wherein the one or more requests retrieve access control information from the network, the access control information indicative of one or more access controls enforced by the network in controlling access by the activated virtual adapter to one or more network components of the network, and wherein the initiating comprises the control component providing one or more indications to the physical adapter, absent involvement of the guest, that the one or more requests be sent by the virtual adapter;

based on the initiating, obtaining, by the control component, the access control information from the physical adapter; and determining, by the control component, based on the obtained access control information, the one or more access controls being enforced by the network in controlling access by the activated virtual adapter to the one or more network components, wherein the initiating initiates sending a first request, of the one or more requests, to determine remote ports of the network that are accessible to the activated virtual adapter, wherein the retrieved access control information comprises an indication of one or more remote ports of the network that are accessible to the activated virtual adapter, wherein the initiating initiates sending a second request, of the one or more requests, to log into a remote port of the indicated one or more remote ports accessible to the activated virtual adapter, and wherein the remote port is a remote port of storage device hosting a storage array, wherein a logical unit of the storage array is indicated by a logical unit number, and wherein a third request of the one or more request comprises a logical unit number interrogation request.

10. The system of claim 9, wherein the one or more network components comprise a storage area network, and wherein the retrieved access control information comprises logical unit number masking data or zoning configuration data for controlling zones of the storage area network, wherein the determining determines one or more storage arrays to which the activated virtual adapter has access, or determines one or more zones of which the activated virtual adapter is a member.

11. The system of claim 9, wherein the system is further configured to perform:
 determining, based on at least some of the obtained access control information, whether an access control of the determined one or more access controls is appropriate for controlling access by the activated virtual adapter to the one or more network components, wherein the determining is performed while the guest remains inactive; and
 based on determining that the access control is not appropriate for controlling access by the activated virtual adapter to the one or more network components, reconfiguring the activated virtual adapter or a network component of the network prior to activating the guest.

12. The computer program product of claim 1, wherein the guest comprises a guest virtual machine hosted by the host system.

13. The system of claim 9, wherein the guest comprises a guest virtual machine hosted by the host system.

\* \* \* \* \*